US011108957B1

(12) United States Patent
Oh et al.

(10) Patent No.: US 11,108,957 B1
(45) Date of Patent: Aug. 31, 2021

(54) LOW POWER OPERATION OF DIFFERENTIAL IMAGE SENSOR PIXELS

(71) Applicant: Microsoft Technology Licensing, LLC, Redmond, WA (US)

(72) Inventors: Minseok Oh, San Jose, CA (US); Cyrus Soli Bamji, Fremont, CA (US); Swati Mehta, Palo Alto, CA (US); Barry Thompson, Menlo Park, CA (US); Andrew Dean Payne, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/903,939

(22) Filed: Jun. 17, 2020

(51) Int. Cl.
*H04N 5/232* (2006.01)
*H04N 5/369* (2011.01)
*H04N 5/3745* (2011.01)
*G01S 17/894* (2020.01)
*H04N 5/343* (2011.01)

(52) U.S. Cl.
CPC ...... *H04N 5/232411* (2018.08); *G01S 17/894* (2020.01); *H04N 5/23245* (2013.01); *H04N 5/343* (2013.01); *H04N 5/36965* (2018.08); *H04N 5/37452* (2013.01)

(58) Field of Classification Search
CPC ......... H04N 5/23241; H04N 5/232411; H04N 5/3696; H04N 5/36965; H04N 5/3745; H04N 5/37452
See application file for complete search history.

(56) References Cited

U.S. PATENT DOCUMENTS

| 9,055,242 | B2 | 6/2015 | Kim et al. |
| 9,471,153 | B1 | 10/2016 | Ivanchenko |
| 9,625,569 | B2 | 4/2017 | Lange |
| 2011/0304842 | A1 | 12/2011 | Kao et al. |
| 2012/0287035 | A1 | 11/2012 | Valko et al. |

(Continued)

OTHER PUBLICATIONS

"LiDAR in a Chip, FlightSense™, Introduction to Time of Flight", Retrieved from: https://www.st.com/content/ccc/resource/sales_and_marketing/presentation/product_presentation/group0/e0/84/0c/fb/11/ec/49/1d/SensorsLive_LiDAR_Chip/files/SensorsLive_LiDAR_Chip.pdf/jcr:content/translations/en.SensorsLive_LiDAR_Chip.pdf, Nov. 1, 2019, 33 Pages.

(Continued)

*Primary Examiner* — Paul M Berardesca
(74) *Attorney, Agent, or Firm* — Alleman Hall Creasman & Tuttle LLP

(57) ABSTRACT

An imaging system includes a sensor array of differential pixels. A controller operates a first differential pixel of the sensor array in a first, lower power mode. The controller supplies a first clock signal to selectively activate a first collection terminal of the first differential pixel for a first duration, and a second clock signal to selectively activate a second collection terminal of the first differential pixel for a second duration. In an analog domain, a first amount of charge accumulated at the first collection terminal over the first duration is readout and compared to a readout of a second amount of charge accumulated at the second collection terminal over the second duration. Responsive to the first amount of charge being different from the second amount of charge by more than a threshold, the first differential pixel of the sensor array is operated in a second, higher power mode.

18 Claims, 13 Drawing Sheets

(56) References Cited

U.S. PATENT DOCUMENTS

| | | | |
|---|---|---|---|
| 2014/0139631 A1* | 5/2014 | Mark | G06F 3/017 |
| | | | 348/46 |
| 2015/0268342 A1 | 9/2015 | Iott et al. | |
| 2016/0178991 A1* | 6/2016 | Wan | G01S 7/4972 |
| | | | 348/169 |
| 2019/0355770 A1* | 11/2019 | Ohmaru | H04N 5/3745 |

OTHER PUBLICATIONS

"Time-of-Flight Distance Measurement Module", Retrieved from: https://www.photonics.com/ProductsiTime-of-Flight_Distance_Measurement_Module/pr64572, Oct. 9, 2019, 2 Pages.

\* cited by examiner

LOW POWER OPERATION OF DIFFERENTIAL IMAGE SENSOR PIXELS

BACKGROUND

A two-dimensional (2D) camera may rely on ambient illumination of a scene to acquire 2D passive light images. Digital computations performed to process and analyze data from a 2D camera can be relatively minimal. Such factors can make a 2D camera relatively power efficient. In contrast, a three-dimensional (3D) camera, such as a time of flight (ToF) camera, may operate by actively illuminating a scene and determining a depth of an object in the scene reflecting the active illumination back to the 3D camera by measuring one or more parameters of the active illumination. The generation of the active illumination and computations to process and analyze data from a 3D camera can be relatively resource intensive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to adjusting power utilized while operating a ToF camera. One example provides an imaging system including a sensor array of differential pixels. A controller operates a first differential pixel of the sensor array in a first, lower power mode. The controller supplies a first clock signal to selectively activate a first collection terminal of the first differential pixel for a first duration, and a second clock signal to selectively activate a second collection terminal of the first differential pixel for a second duration. In an analog domain, a first amount of charge accumulated at the first collection terminal over the first duration is readout and compared to a readout of a second amount of charge accumulated at the second collection terminal over the second duration. Responsive to the first amount of charge being different from the second amount of charge by more than a threshold, the first differential pixel of the sensor array is operated in a second, higher power mode.

DETAILED DESCRIPTION

Operation of a time-of-flight (ToF) camera may be both computationally expensive and power intensive in some instances. Particularly for imaging systems that are powered by a battery, being able to reduce power consumption while maintaining frame rate requirements for accurate depth imaging may be desirable.

ToF cameras that operate with differential pixels have various power expenditures, including clock toggling between the A and B differentials, analog-to-digital converter (ADC) operations, and operation of the internal illumination source, which may comprise a laser. However, a scene or portions of a scene being imaged at times may feature slow moving or static objects. As such, continuously illuminating the entire scene and processing depth data at each pixel at a relatively higher rate may waste power under some circumstances.

To save power, the camera may be configured to react to the scene at hand, only illuminating portions of the scene that are of immediate interest. Schemes such as "progressive wake" and depth-on-demand have been considered, which expend computational resources and power only when needed. However, most such schemes involve reading one frame, storing it in memory, then reading another frame and making a comparison digitally. This requires both the use of the ADC and the memory.

Accordingly, systems and methods are disclosed for providing scene-based operating modes that may provide power savings at the pixel, the illumination source, and the ADC when presented with a relatively static scene or uninteresting portions of a scene.

As an example, the pixels are operated in a first, lower power mode as a default condition. Low frequency images for a pixel are obtained and compared in the analog domain to determine if there is a brightness change in the field-of-view of the pixel. A brightness change greater than a threshold causes generation of a wake-up signal, thereby causing the pixel to operate in a higher power mode. By comparing analog voltages, the ADC need not be invoked, and storage of a prior image in memory may be omitted.

If, during operation at the higher power mode, brightness becomes static, the pixel may be returned to the lower power mode. In some examples, a subset of sampling pixels may be operated in the lower power mode, while the rest of the pixels are turned off. A wake-up signal may be applied to a region of pixels, thus realizing additional power savings. By staggering the reading of pixel rows, step-changes of scene brightness may be detected whether they occur during integration or readout.

Figure 1A:
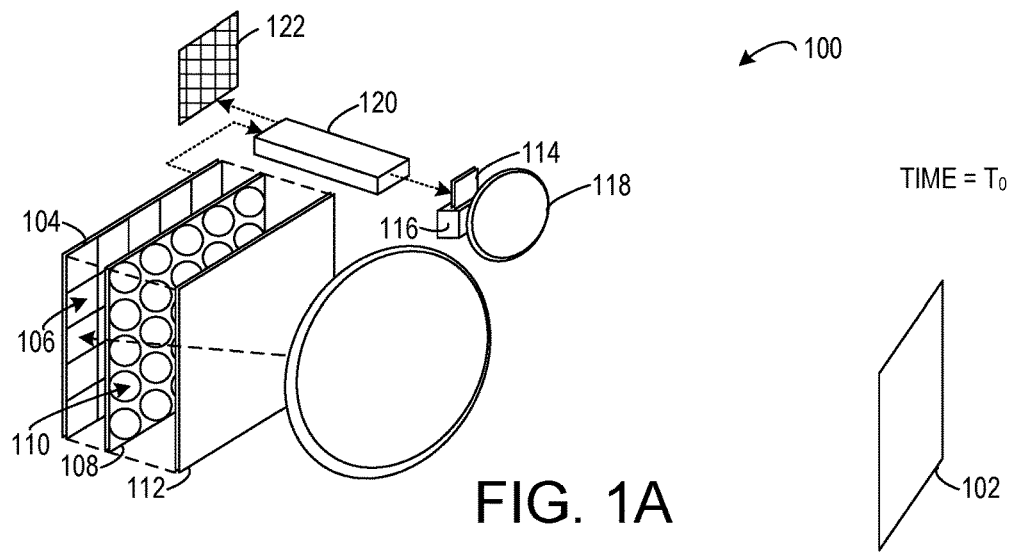
FIGS. 1A-1C schematically show an example imaging system.
Figure 1B:
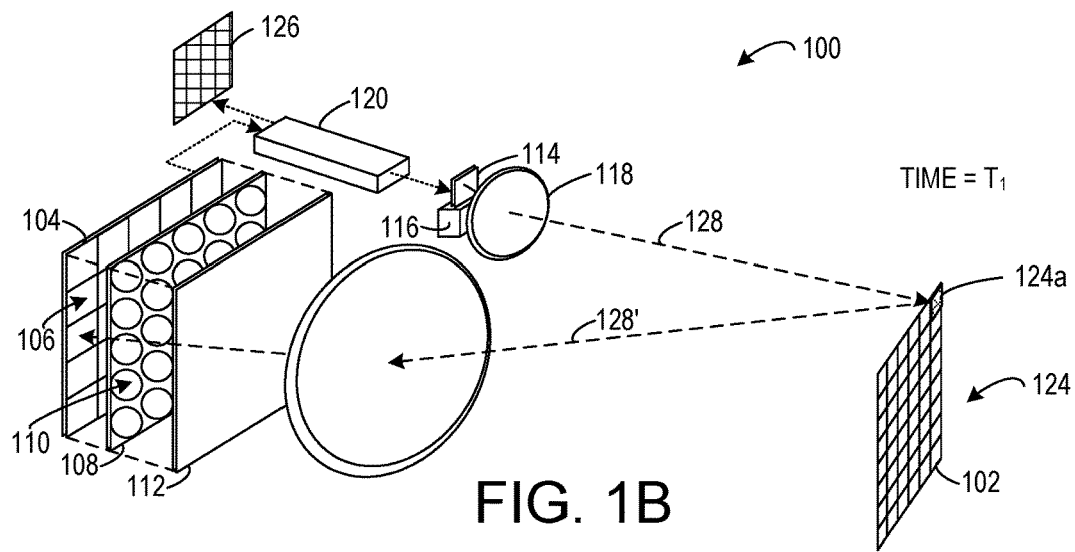
Figure 1C:
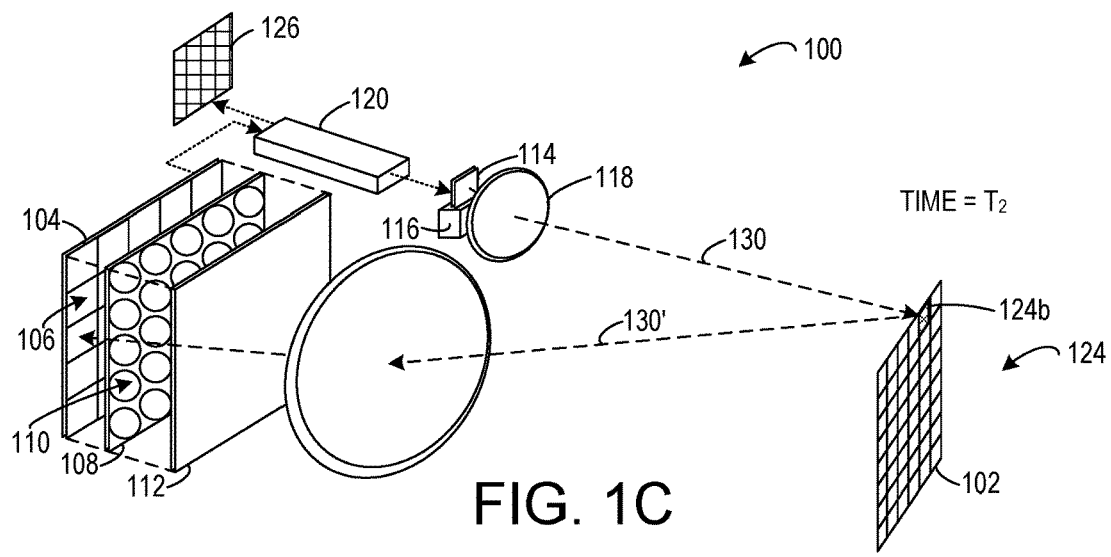

FIGS. 1A-1C show aspects of an example imaging system 100. The imaging system 100 also may be referred to herein as a camera. The term 'camera' refers herein to any imaging component having at least one optical aperture and sensor array configured to image a scene or subject 102. The imaging system 100 includes a sensor array 104 of individually addressable pixels 106. In some implementations, the pixels may be complementary metal-oxide semiconductor (CMOS) elements, but other suitable architectures are envisaged as well. Each pixel is responsive to light over a broad wavelength band. For silicon-based (e.g. CMOS) pixels, the wavelength response may range from 300 to 1000 nm, for example. The sensor array 104 is schematically illustrated with only twenty-five pixels 106 for simplicity, although any suitable other number of pixels may be used.

In some implementations, the pixels 106 of sensor array 104 may be differential pixels. Each differential pixel may include different collection terminals that are energized according to two different clock signals. In one example, to measure modulated active illumination, the two clock signals may be substantially complementary (e.g., the two clock signals have 50% duty cycles that are 180 degrees out of phase). In other examples, the two different clock signals may have a different relationship, such as for measuring ambient illumination or non-modulated active illumination.

Such operation allows for the same sensor array to be used to measure active light across a broad spectrum including ultraviolet, visible, NIR, and IR light. Further, the differential pixels may reduce system noise, because only one read operation is used to perform a differential measurement of active spectral light and ambient light (i.e., a difference of a measurement of active light and ambient light and a measurement of ambient light without active light). In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be written to memory. Additional aspects of differential pixel structure and operation are described herein and with regard to FIG. 3.

In other camera implementations that do not include sensor arrays of differential pixels, additional clock cycles may be used to perform a differential measurement. While differential pixels provide the advantages described herein, it will be appreciated that other types of sensor array, including non-differential sensor arrays, may be used.

Microlens array 108 optionally may be arranged directly over sensor array 104. Microlens array 108 includes a plurality of microlens elements 110. Each microlens element 110 of microlens array 108 may be registered to a differential pixel 106 of the sensor array 104. When included, microlens array 108 may provide a larger effective fill factor at each of the pixels, for increased collection efficiency and reduced crosstalk between pixels.

Optical shutter 112 optionally may be arranged over sensor array 104, so as to optically cover the sensor array. When included, the optical shutter 112 is electronically switchable between different light-filtering states. In one example, the optical shutter 112 may include two or more light filtering states. In one filtering state, the optical shutter 112 may transmit IR light and block light outside of the IR band (e.g., visible light). In another filtering state, the optical shutter 112 may transmit visible light and block light outside of the visible light sub-band (e.g., IR light). The optical shutter 112 may be configured to transmit light in any suitable selected sub-band of the electromagnetic spectrum and block light outside of the selected sub-band. The optical shutter 112 may increase a signal-to-noise ratio of IR images and visible light images acquired by the sensor array 104. The optical shutter 112 may include any suitable type of filter that transmits a narrow-band of light without significantly reducing the intensity of the in-band signal received by the sensor array. In one example, the optical shutter may include one or more liquid crystal layers. Optical shutter 112 may be configured as a global shutter, wherein accumulated charge is stored in a light-shielded region on a per-pixel or per-group-of pixels basis. Optical shutter 112 may additionally or alternatively be configured as a rolling shutter, wherein readouts of different portions of the image frames are performed at different times, such as on a sequential, line-by-line basis.

In some implementations, the optical shutter may be omitted from the imaging system 100. For example, the optical shutter may be omitted in order to reduce a cost and/or complexity of an imaging optical stack. In some cases, omitting the optical shutter may allow the imaging optical stack to advantageously have a smaller total optical track length (TTL), because an imaging lens can be designed without the added complexity of having a tunable filter in the imaging optical stack.

A steerable illumination source 114 may be configured to selectively emit active illumination to illuminate the scene 102. The steerable illumination source 114 may emit any suitable active illumination. In some implementations, the steerable illumination source 114 may be modulated. In other implementations, the steerable illumination source 114 may be un-modulated. In some examples, the steerable illumination source 114 may include a solid-state laser or a LED operating in the near-infrared or infrared (IR) range (~850 nm) to emit active IR light.

In other implementations, the steerable illumination source 114 may be configured to emit active illumination light in a visible spectral band. In some examples, the steerable illumination source 114 may include a broad-band illumination source, such as a white light source. In some examples, the steerable illumination source 114 may include a plurality of spectral illuminators (e.g. LEDs). In some such examples, the plurality of spectral illuminators may be configured to emit active illumination in the same spectral band, although this is not required.

In some examples, the steerable illumination source 114 may be configured to selectively emit active illumination light having a narrow field that is sized to illuminate an active illumination zone in the scene 102. Further, the steerable illumination source 114 comprises a steering element 116 configured to steer the active illumination light emitted from the steerable illumination source 114 to individually actively illuminate different illumination zones of a plurality of illumination zones 124 (shown in FIGS. 1B and 1C) in the scene 102 viewed by the sensor array 104. Such a zoned arrangement produces an active illumination light having a smaller angular extent than the field of view of the sensor array 104, and thereby may provide a greater power density for the same peak power of the active illumination relative to full-field imaging. An illumination zone may be configured to be any suitable size that is less than an entire field of view of the scene viewed by the sensor array 104. In some examples, the size of each illumination zone may be based on characteristics of the steerable illumination source 114. Nonlimiting examples of such characteristics include size, power consumption, frequency, angle, positional repeatability, and drive voltage requirements of the steerable illumination source 114.

In some implementations, a calibration procedure may be performed on the imaging system 100 to determine a plurality of illumination zones. The calibration procedure may further include determining pixels 106 of the sensor array 104 that spatially map to each illumination zone. In some examples, the determined illumination zones may collectively cover the entire field of view of the scene 102 viewed by the sensor array 104. In some examples, different illumination zones may overlap each other. Any suitable number of illumination zones may be determined to collectively cover the field of view of the sensor array 104. Further, any suitable number of pixels of the sensor array may be mapped to each illumination zone.

The steering element 116 may include any suitable mechanical, electro optical, micro-electro-mechanical-systems (MEMS), electrowetting prism componentry, and/or other steering componentry configured to suitably steer the active illumination emitted from the steerable illumination source 116 to illuminate a designated illumination zone. In some examples, the steering element 116 may comprise a movable mirror, providing for a mechanical steering component to steer the active illumination light to illuminate an illumination zone in the scene 102. In some examples, the steering element 116 may comprise one or more mirrors. In one example, at least one of a plurality of mirrors comprises a movable mirror (e.g., a micromirror). In some examples, the steering element 116 may comprises a refracting lens (e.g., Fresnel, prismatic, etc.) with a non-uniform surface that directs, or steers, light in differing directions based on the input light's lateral position. In some examples, the steering element 116 may comprise a switchable polarization grating, providing for an electro-optical steering component. In some examples, the steering element 116 may comprise a liquid crystal lens system (for example a pair of liquid crystal lenses), providing for steering by an electrowetting steering solution (an electrowetting component). In some examples, the liquid crystal lenses may be arrays of microlenses suspended in a liquid crystal that can be adjusted electrically to steer light.

In some implementations, the steerable illumination source 114 optionally may include one or more optical elements 118. For example, the optical element(s) 118 may include one or more of a collimating element, diffusing element, and a focusing element. The collimating element may be operative to collimate light emitted from the steerable illumination source 114 into collimated light. The diffusing element may be operative to diffuse light emitted from the steerable illumination source 114, thereby converting the collimated light into diffused light having a desired profile (e.g., uniform or Gaussian power profile). The focusing element may be operative to focus the diffused light at a designated focal length. Such a designated focal length may be selected based on application or any other suitable factors. In some implementations, any or all of these optical elements may be omitted from the steerable illumination source 114.

A controller 120 may include a logic machine and associated storage machine. The storage machine may hold instructions that are executable by the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded.

The controller 120 may be configured to individually control the pixels 106 of the sensor array 104 and the steerable illumination source 114 to selectively acquire different types of images (e.g., 2D, 3D) of at least a portion of the scene 102 viewed by the sensor array 104. The controller 120 may be configured to control the sensor array 104 to acquire a full-field 2D image. In the illustrated example shown in FIG. 1A, at time $T_0$, the controller 120 may be configured to address all of the pixels 106 of sensor array 104 while the steerable illumination source 114 is deactivated to acquire a 2D passive light image (e.g., monochrome or color image) of the scene 102. As used herein, time $T_0$ is considered to include the full duration from the beginning of time $T_0$ until time $T_1$, and thus allows for sequentially addressing the individual pixels in the $T_0$ timeframe. The same convention is used for other times discussed herein. As used herein, the term 'deactivated' means the steerable illumination source 114 does not emit active illumination light to illuminate the scene 102. When the steerable illumination source 114 is deactivated, the steerable illumination source 114 may consume minimal or no power. Instead, in this case, the sensor array 104 relies on the ambient illumination of the scene 102 to acquire the 2D passive light image 122. In implementations where the optical shutter 112 is included, the controller 120 may be configured to switch the optical shutter 112 to allow light in the visible spectrum to pass through to the sensor array 104.

The controller 120 may be configured to control the sensor array 104 and the steerable illumination source 114 to acquire image data based on active illumination for individual illumination zones of the scene 102. The controller 120 may use such image data based on active illumination to determine depth values of objects located in the illumination zone as described in further detail below. In the illustrated example shown in FIG. 1B, at time $T_1$, the steerable illumination source 114 is configured to emit active IR illumination light. The controller 120 may be configured to control (i.e., activate and steer) the steerable illumination source 114 to illuminate a first illumination zone 124a with active IR illumination light 128. The controller 120 may be configured to address the pixels 106 of sensor array 104 that are mapped to the first illumination zone 124a to acquire IR image data for the first illumination zone. In particular, active IR illumination light 128' reflected from an object locus in the scene 102 that is incident on each sensor that is mapped to the first illumination zone 124a is measured for IR image acquisition. Note that the controller 120 may not address or "read out" the pixels 106 of the sensor array 104 that are not mapped to the first illumination zone 124a at time $T_1$ in order to increase power efficiency of the imaging system 100. When optical shutter 112 is included, the controller 120 may be configured to switch the optical shutter 112 to block light outside of the IR (or near IR) light sub-band in synchronicity with activation of the steerable illumination source 114 for IR image acquisition of the first illumination zone 124a.

Further, as shown in FIG. 1C, at time $T_2$, the controller 120 may be configured to control (i.e., activate and steer) the steerable illumination source 114 to illuminate a second illumination zone 124b with active IR illumination light 130. The controller 120 may be configured to address the pixels 106 of sensor array 104 that are mapped to the second illumination zone 124b to acquire R image data for the second illumination zone. In particular, active IR illumination light 130' reflected from an object locus in the scene 102 that is incident on each pixel that is mapped to the second illumination zone 124b is measured for IR image acquisition. Note that the controller 120 may not address or "read out" the pixels 106 of the sensor array 104 that are not mapped to the second illumination zone 124b at time $T_2$ in order to increase power efficiency of the imaging system 100. When optical shutter 112 is included, the controller 120 may be configured to switch the optical shutter 112 to block light outside of the IR (or near IR) light sub-band in synchronicity with activation of the steerable illumination source 114 for R image acquisition of the second illumination zone 124b.

The controller 120 may be configured to repeat the above described imaging operations to acquire image data based on active illumination for any suitable number of different illumination zones. For example, such image data may be acquired for 3D imaging of the different illumination zones. In some examples, the entire field of view of the scene viewed by the sensor array 104 may be imaged by sequentially individually imaging a plurality of illumination zones that cover the field of view. In some examples, only an identified region of interest covered by one or more illumination zones may be imaged by individually imaging the illumination zone(s) that cover the identified region of interest.

The term 'address' as applied to pixels 106 of sensor array 104 may have a somewhat different meaning depending on the imaging mode described. For flat-imaging—for spectral light including both visible and IR light-addressing the pixels 106 may include integrating the intensity of ambient light received at each pixel 106 and associating the integrated intensity of the ambient light in the sub-band with the portion of the 2D image corresponding to that pixel.

For depth and/or 3D imaging, the pixels 106 may be addressed differently. Here, addressing the pixels may include resolving a phase offset from each pixel relative to the modulated intensity of the IR light. The phase offset, optionally converted into the depth domain, may be associated with the portion of the image corresponding to the pixel addressed. In other words, the controller 120 may be configured to determine a depth value for each pixel 106 of the sensor array 104 that is addressed. In some implementations, a series of IR image acquisitions (e.g., 6-9) in rapid succession may be used to obtain the phase offset. In combination 2D/3D imaging applications, both of the above addressing modes may be used in a time multiplexed manner.

The phase-discriminating time-of-flight (ToF) approach described above is one of several depth-imaging technologies encompassed by this disclosure. In general, a depth-imaging camera may be configured to acquire one or more depth maps of a scene or subject. The term 'depth map' refers to an array of pixels registered to corresponding regions $(X_i, Y_i)$ of an imaged scene, with a depth value $(Z_i)$ indicating, for each pixel, the depth of the corresponding region. In some examples, 'Depth' may be defined as a coordinate parallel to the optical axis of the camera, which increases with increasing distance from the camera. In other examples, depth may be defined as a radial distance from the camera. The term 'depth video' refers herein to a time-resolved sequence of depth maps. In ToF implementations, the IR illumination source (e.g., the steerable illumination source 114) may project pulsed or otherwise modulated IR illumination towards the scene. The sensor array of the depth-imaging camera may be configured to detect the phase offset between the illumination reflected back from the scene and the modulated emission. In some implementations, the phase offset of each pixel may be converted into a pixel-resolved time of flight of the pulsed illumination, from the illumination source to the scene and then back to the array. ToF data may then be converted into depth data.

The controller 120 may be configured to output 2D image data and 3D image data (or depth data) in any suitable form. As one example, the controller 120 may be configured to output a matrix of pixels 126. Each pixel in the matrix includes a depth value $(Z_i)$ and one or more visible light values (e.g., monochrome or color values). In some examples, the controller 120 may output the matrix of pixels 126 as a data structure in which each element of the matrix corresponds to a different pixel, and each element of the matrix includes an array of values corresponding to the depth value and the one or more visible light values for that pixel. The controller 120 may be configured to output the matrix of pixels 126 (and/or any other suitable parameter value) to any suitable recipient internal or external to the imaging system 100. In one example, the controller 120 may be configured to output the matrix of pixels 126 to another processing component for additional image processing (e.g., filtering, computer vision). In some examples, the processing component may be incorporated into the imaging system 100. In other examples, the processing component may be incorporated into a remote computing device in communication with the imaging system 100. In further examples, the controller 120 may be configured to output the matrix of pixels 126 to an external display device for visual presentation as an image. Additionally, in some implementations, the 2D and 3D image data may be represented using different data structures (e.g., a first matrix for monochrome or color values and a second matrix for depth values).

Figure 2:
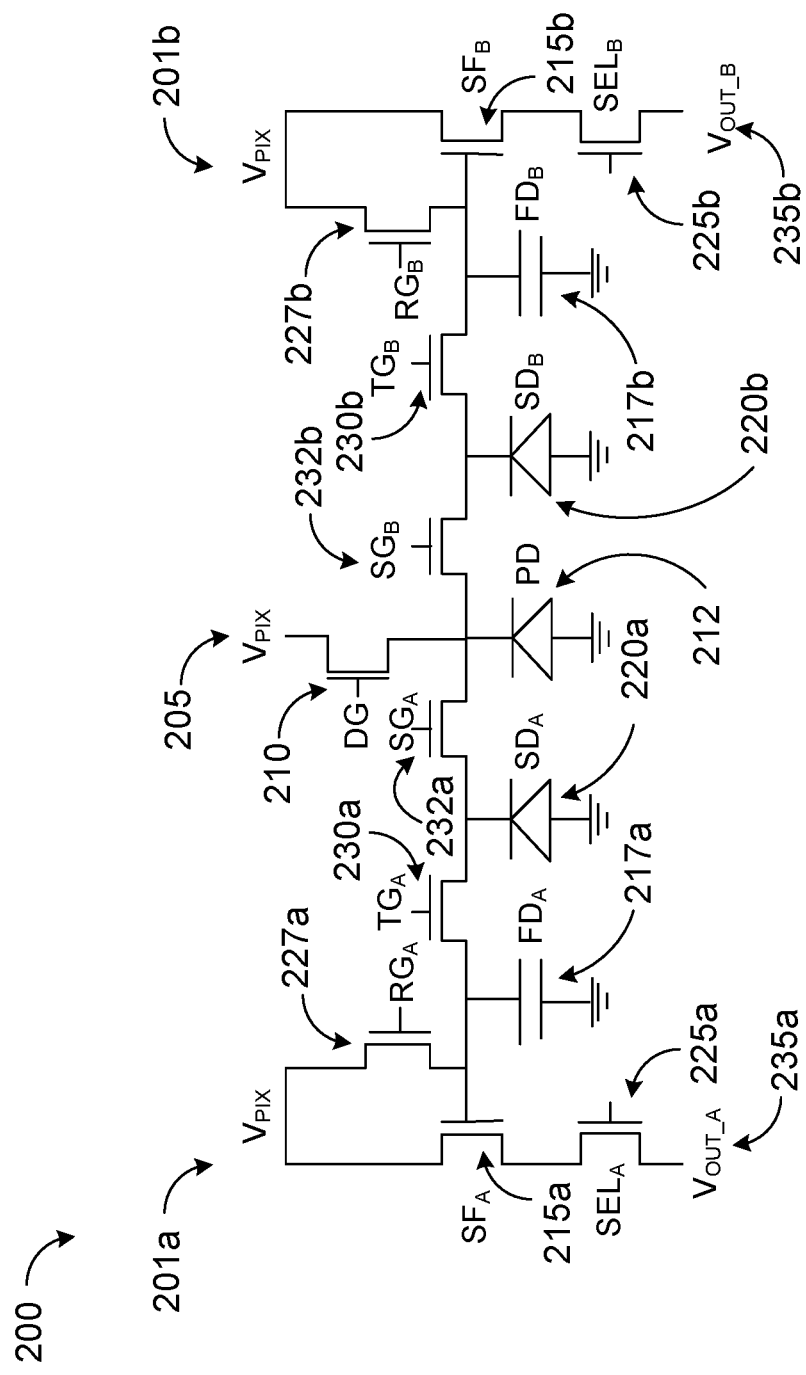
FIG. 2 schematically shows an example circuit for a transfer gate time-of-flight pixel.

In some implementations, the pixels 106 of sensor array 104 may be differential pixels, such as transfer gate ToF pixels and/or photogate ToF pixels. FIG. 2 shows an example schematic of a transfer gate ToF pixel 200. While this detailed description will primarily be described using transfer gate ToF pixels as examples, the systems and methods described herein are also applicable to photogate ToF pixels and to other differential ToF pixel types. ToF pixel 200 includes an "A" circuit 201a and a "B" circuit 201b, both of which may be exposed to pixel voltage 205 ($V_{PIX}$) when activated. ToF pixel 200 includes a common drain gate 210 (DG) and a common photodiode 212 (PD).

Each of circuits 201a and 201b include passive elements, such as source followers 215a and 215b ($SF_A$, $SF_B$), floating diffusion capacitors 217a and 217b ($FD_A$, $FD_B$), and storage diodes 220a and 220b ($SD_A$, $SD_B$). Each of circuits 201a and 201b include actuatable elements such as row select transistors 225a and 225b ($SEL_A$, $SEL_B$), reset gates 227a and 227b ($RG_A$, $RG_B$), transfer gates 230a and 230b ($TG_A$, $TG_B$), and storage gates 232a and 232b ($SG_A$, $SG_B$). Selective operation of each gate under a clocking signal determines where within ToF pixel 200 charge integrates over time and when that accumulated charge is read out at collection nodes 235a and 235b ($V_{OUT\_A}$, $V_{OUT\_B}$).

During normal operation in ToF mode, the A circuit 201a and B circuit 201b are energized sequentially, and may alternate at a frequency on the order of hundreds of MHz in some examples. All of the electrons collected during the time period when circuit 201a is energized are read out at output node 235a, and all the photons that impinge on the pixel when circuit 201b is energized are read out at output node 235b.

Figure 3:
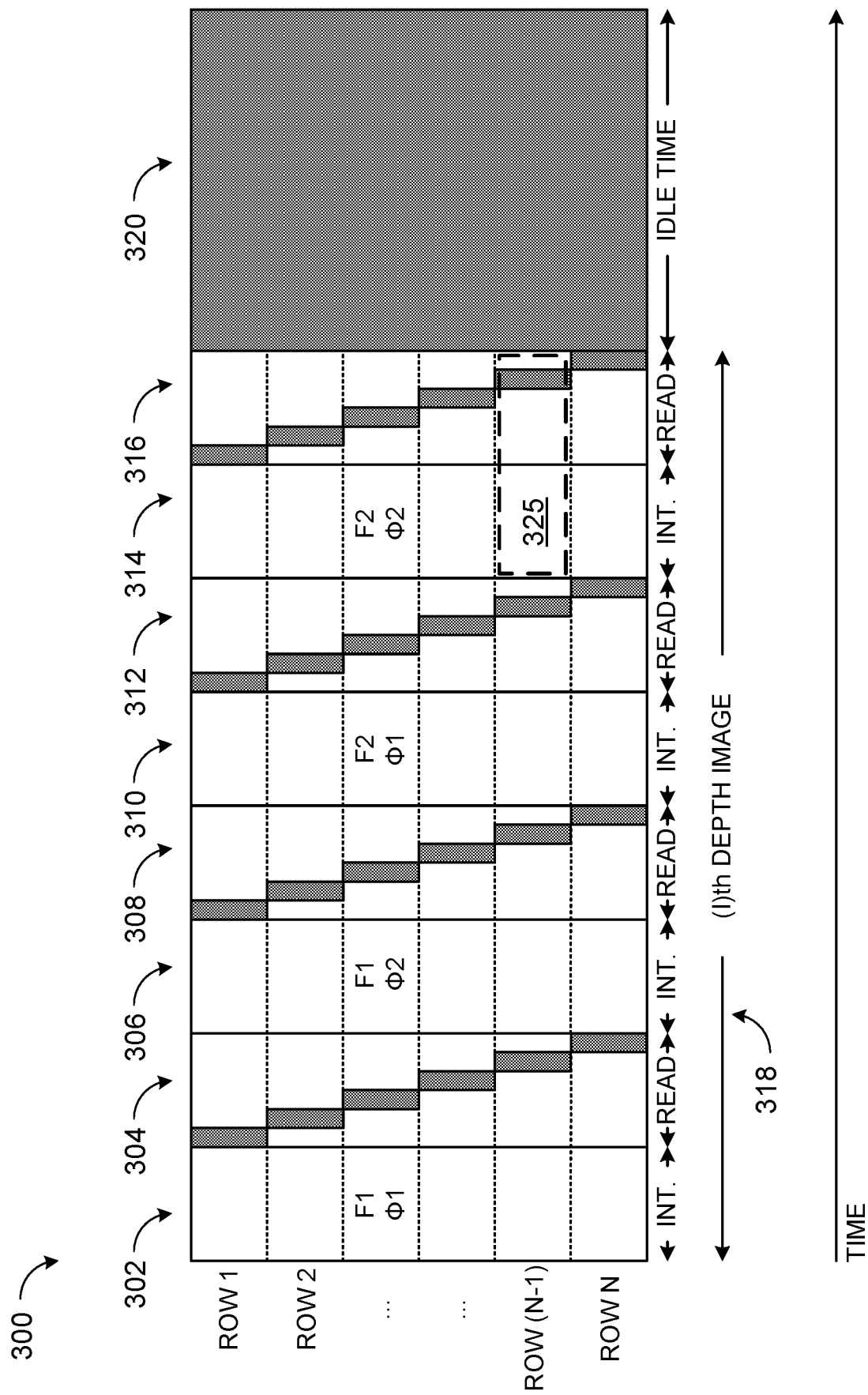
FIG. 3 shows an example timing diagram for global shutter operation of a transfer gate time-of-flight pixel.

FIG. 3 depicts an example timing diagram 300 for operation of a ToF pixel array under a global shutter. Diagram 300 indicates an arbitrary number of N rows. In this example, conventional operation is depicted for the case of 2 different modulation frequencies & phase delay captures. While this detailed description will primarily be described using ToF pixels under global shutter operations as examples, the systems and methods described herein are also applicable to ToF pixels operating under rolling shutter operations.

In this example, at 302, A and B circuits for pixels within rows 1-N are alternately energized for an integration time using a first modulation frequency (F1) and a first phase delay ($\Phi$1). At 304, rows 1-N are read out, sequentially. At 306, A and B circuits for pixels within rows 1-N are alternately energized for an integration time using the first modulation frequency (F1) and a second phase delay ($\Phi$2). At 308, rows 1-N are read out, sequentially. At 310, A and B circuits for pixels within rows 1-N are alternately energized for an integration time using the second modulation frequency (F2) and the first phase delay ($\Phi$1). At 312, rows 1-N are read out, sequentially. At 314, A and B circuits for pixels within rows 1-N are alternately energized for an integration time using the second modulation frequency (F2) and the second phase delay ($\Phi$2). At 316, rows 1-N are read out, sequentially. The combined readouts from 304, 308, 312, and 316 are used to generate a depth image 318. The array is then idle for a duration at 320.

Figure 4:
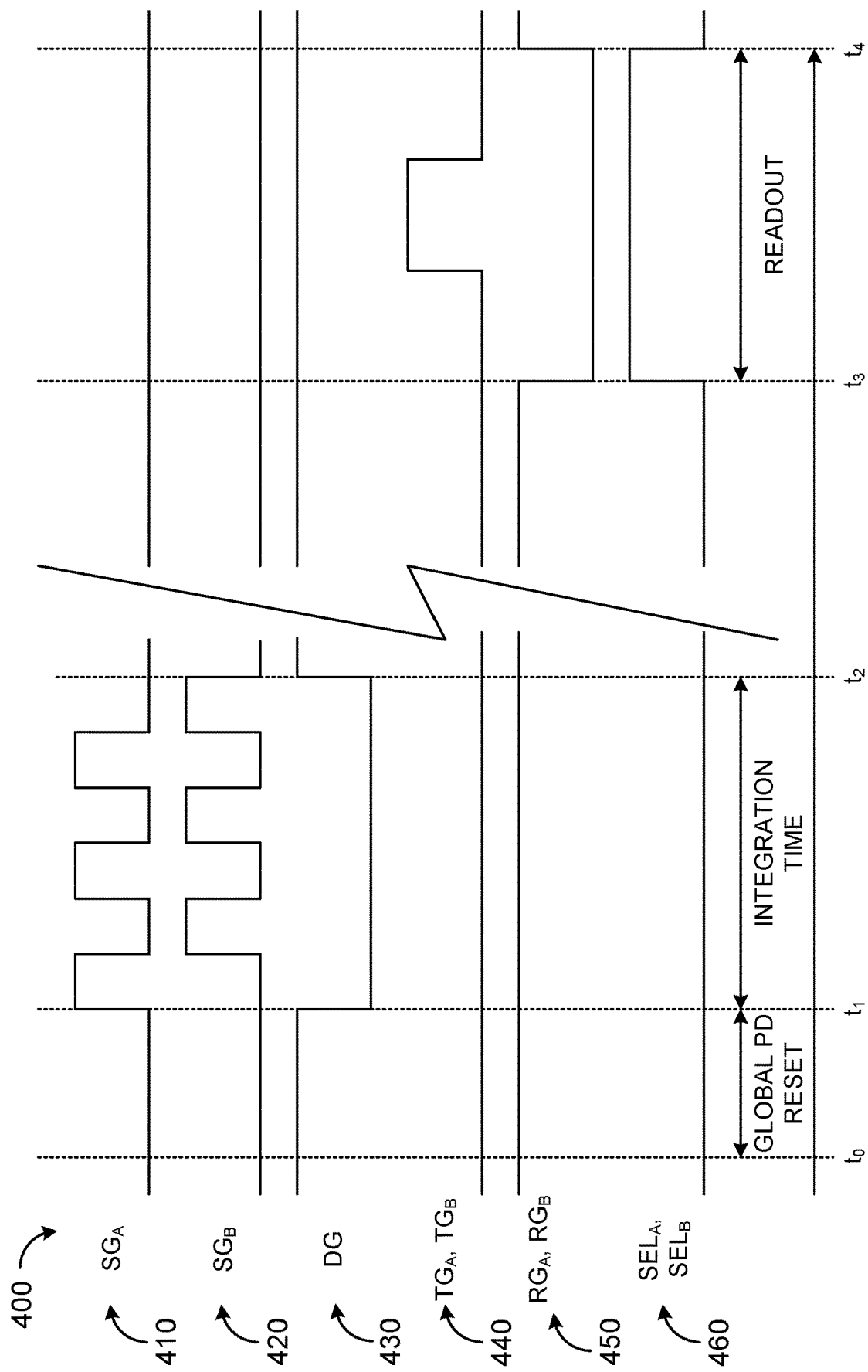
FIG. 4 shows an example timing diagram for a single row of a transfer gate time-of-flight pixel under global shutter operation.

At 325, one frame for one row is highlighted (dashed line). FIG. 4 depicts an example timing diagram 400 of a such a single row of a TOF pixel operation under a global shutter. Diagram 400 will be described with regards to differential pixel 200 and its components. Diagram 400 includes plot 410, indicating actuation of storage gate A ($SG_A$) over time, and plot 420, indicating actuation of storage gate B ($SG_B$) over time. Diagram 400 further includes plot 430, indicating actuation of a common drain gate (DG) over time. Diagram 400 further includes plot 440, indicating actuation of transfer gates A & B ($TG_A$, $TG_B$) over time, plot 450, indicating actuation of reset gates A & B ($RG_A$, $RG_B$) over time, and plot 460, indicating actuation of row selectors A & B ($SEL_A$, $SEL_B$) over time. In some example, the readout may be performed using correlated double sampling (CDS). This may include reading each collection node twice, thus providing an improved signal compared to a single reading of each collection node.

From time $t_0$ to time $t_1$ the row undergoes a global reset of the photodiodes (PD) of each pixel by actuating the drainage gate, as shown at 430. At time $t_1$, the drainage gate is closed, and integration begins, extending to time $t_2$. From time $t_1$ to time $t_2$, storage gates A and B are alternately actuated, as shown at 410 and 420. At time $t_2$, the drainage gate is again opened, while the row waits for its turn to readout. At time $t_3$, the reset gates are closed, and the row selectors are actuated in order to initiate readout, as shown at 450 and 460, respectively. Charge transfer from the storage diode to the floating diffusion is performed by actuating the transfer gates for a duration, as shown at 440. At time $t_4$, the row selectors are de-actuated and the reset gates are actuated, ending readout for this row.

Figure 5:
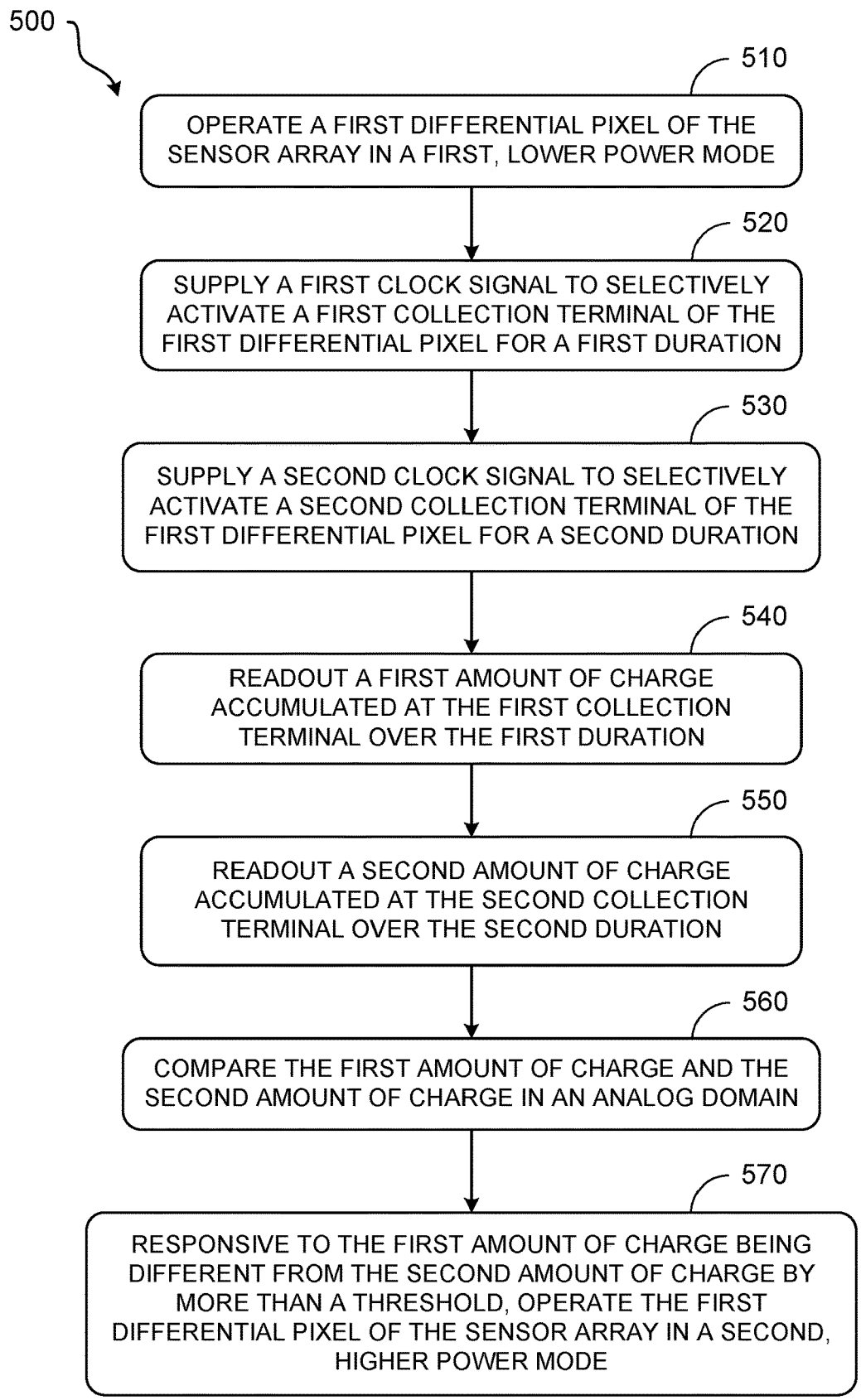
FIG. 5 shows a flow diagram illustrating an example method for operating a differential time-of-flight pixel.

FIG. 5 shows a flow chart for an example method 500 for operating a differential time-of-flight pixel. Method 500 may be used by a time-of-flight imaging device to reduce power expenditures, such as in a progressive wake mode of operation.

At 510, method 500 includes operating a first differential pixel of the sensor array in a first, lower power mode. The first low power mode may be designated as a default mode. For example, the first, lower power mode may include a lower frequency switching between an A portion of the differential pixel and a B portion of the differential pixel during an integration period (e.g., 200 Hz), rather than a higher frequency switching associated with depth imaging (e.g., 200 MHz).

Additionally or alternatively, the first, low power mode may be a passive mode, wherein an illumination device typically used in generating ToF data is inactive. Rather, the differential pixel may be configured to integrate ambient light present in the environment. Further, the voltage read out from the A and B portions may be performed without the use of the ADC, thereby realizing additional power savings.

At 520, method 500 includes supplying a first clock signal to selectively activate a first collection terminal of the first differential pixel for a first duration. For example, each of the A portion and B portion may be activated or energized for a single duration (e.g., 5 ms), rather than switching back and forth on the order of MHz frequency (e.g., 10 ns).

At 530, method 500 includes supplying a second clock signal to selectively activate a second collection terminal of the first differential pixel for a second duration. In some examples, the second clock signal may be substantially complementary to the first clock signal. The second duration may be equal in length to the first duration, but could also be shorter or longer in duration in some examples. However, in some examples the first and second clock signals may be configured such that the first and second collection terminals have overlapping activation periods or gapped activation periods. As described with regard to FIG. 4, for ToF applications, clock signals may toggle between the A and B portions at MHz frequencies. Each transition consumes power ($CV^2F$). By reducing the number of cycles, for example from 1000 cycles to 1-2, power savings are realized. Additionally, the number of images that are taken can be reduced to 1, rather than the multiple images (e.g., 4-6) that are needed to derive an accurate depth frame.

Figure 6:
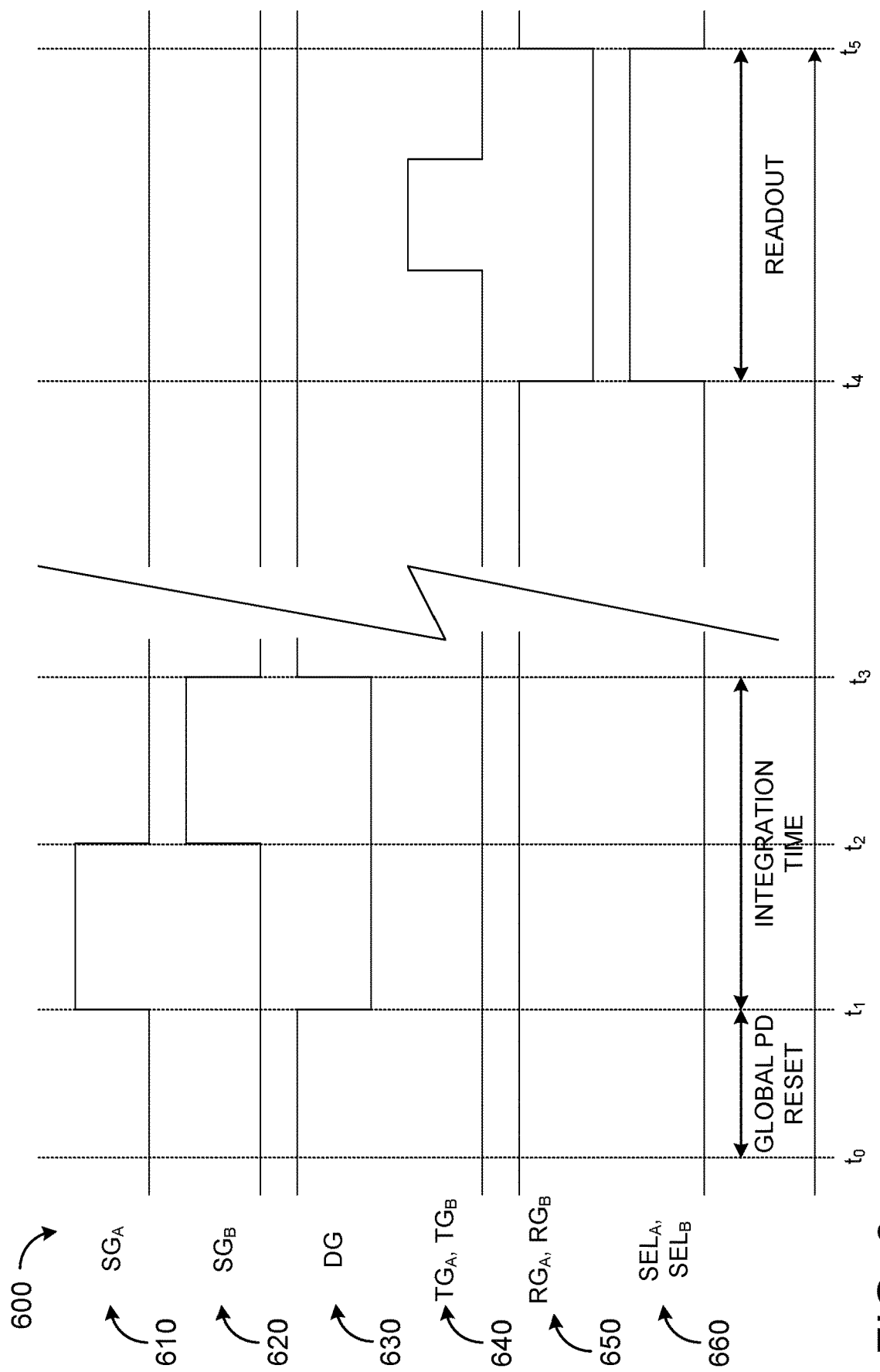
FIG. 6 shows an example timing diagram for operating a differential time-of-flight pixel using the method of FIG. 5.

An example of operating a pixel in this manner is shown in FIG. 6. FIG. 6 shows an example timing diagram 600 for a single row of a TOF pixel operation under a global shutter. Diagram 600 will be described with regards to differential pixel 200 and its components. Diagram 600 includes plot 610, indicating actuation of storage gate A ($SG_A$) over time, and plot 620, indicating actuation of storage gate B ($SG_B$) over time. Diagram 600 further includes plot 630, indicating actuation of a common drain gate (DG) over time. Diagram 600 further includes plot 640, indicating actuation of transfer gates A & B ($TG_A$, $TG_B$) over time, plot 650, indicating actuation of reset gates A & B ($RG_A$, $RG_B$) over time, and plot 660, indicating actuation of row selectors A & B ($SEL_A$, $SEL_B$) over time.

From time $t_0$ to time $t_1$ the row undergoes a global reset of the photodiodes (PD) of each pixel by actuating the drainage gate, as shown at 630. At time $t_1$, the drainage gate is closed, and integration begins. From time $t_1$ to time $t_2$, storage gate A is actuated, as shown at 610. From time $t_2$ to time $t_3$, storage gate B is actuated, as shown at 620. In contrast to the timing diagram shown in FIG. 4, here each storage gate is opened for a single, elongated duration.

Returning to FIG. 5, at 540, method 500 includes reading out a first amount of charge accumulated at the first collection terminal over the first duration. The first amount of charge may be read out in the analog domain, and not be directed to the ADC. Continuing at 550, method 500 includes reading out a second amount of charge accumulated at the second collection terminal over the second duration. The first and second amounts of charge may be read out in the analog domain, and not be directed to the ADC. Alternatively, the first and second amounts of charge may be readout in a way where a lower ADC bit depth is feasible for making a comparison.

Reading out of the first amount of charge accumulated at the first collection terminal over the first duration and the second amount of charge accumulated at the second collection terminal over the second duration may occur concurrently or sequentially depending on the pixel configuration. For example, returning to FIG. 6, at time $t_3$, the drainage gate is again opened. At time $t_4$, the reset gates are closed, and the row selectors are actuated in order to initiate the readout, as shown at 650, and 660 respectively. Charge transfer from the storage diode to the floating diffusion is performed by actuating transfer gates A & B for a duration, as shown at 640. At time $t_5$, the row selectors are de-actuated, and the reset gates are actuated, ending readout for this row.

Figure 7:
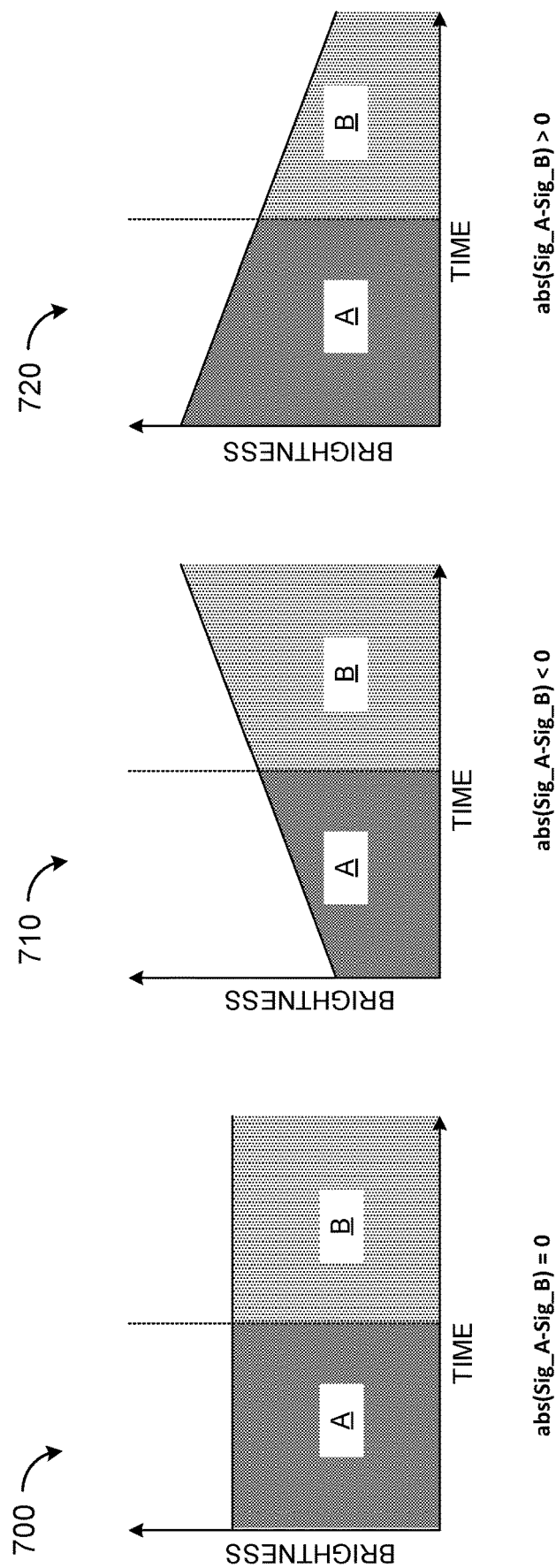
FIG. 7 shows example plots for brightness changes in an environment.

Returning to FIG. 5, once both collection terminals have been integrated, method 500 may proceed to 560. At 560, method 500 includes comparing the first amount of charge and the second amount of charge in an analog domain. As shown in FIG. 7, motion leads to brightness changes over time that can be determined from the comparison of the first and second amounts of charge. This comparison may then be used to decide as to whether to advance the pixel to a higher power mode.

FIG. 7 shows three example plots, 700, 710, and 720. Plot 700 depicts a scene with static brightness. Plot 710 depicts a scene with increasing brightness over time. Plot 720 depicts a scene with decreasing brightness over time (e.g., getting darker). For a static scene, such as the scene represented by plot 700, Sig_A-Sig_B=0; and thus abs(Sig_A-Sig_B)=0. For a scene with increasing brightness, such as the scene represented by plot 710, Sig_A-Sig_B<0; and thus abs(Sig_A-Sig_B)>0. For a scene with decreasing brightness, such as the scene represented by plot 720 Sig_A-Sig_B>0; abs(Sig_A-Sig_B)>0. The value of abs(Sig_A-Sig_B) may be determined in the analog domain, bypassing the ADC. Any change in brightness in the field of view of the pixel will cause abs(Sig_A-Sig_B) to increase.

Returning to FIG. 5, at 570, method 500 includes, responsive to the first amount of charge being different from the second amount of charge by more than a threshold, operating the first differential pixel of the sensor array in a second, higher power mode.

In some examples the threshold may be based on the first amount of charge and the second amount of charge. In other words, the threshold may be based on the signal level, so that fluctuations due to noise do not result in the threshold being breached. As such, the threshold may be continuously updated, so as always to exceed the noise level.

When the signal S on a pixel is low the noise N in the signal is also small (e.g., shot noise). As such, a relatively small detection threshold T may be set to be greater than N However, when the signal S on a pixel is high, the noise N in the signal is also high (e.g., due to the shot noise). To avoid spurious false positives, a relatively large detection threshold may be selected. For example, in daylight, bright images are inherently noisy, and a threshold used for a relatively dark, indoor environment may be ineffective.

Figure 8:
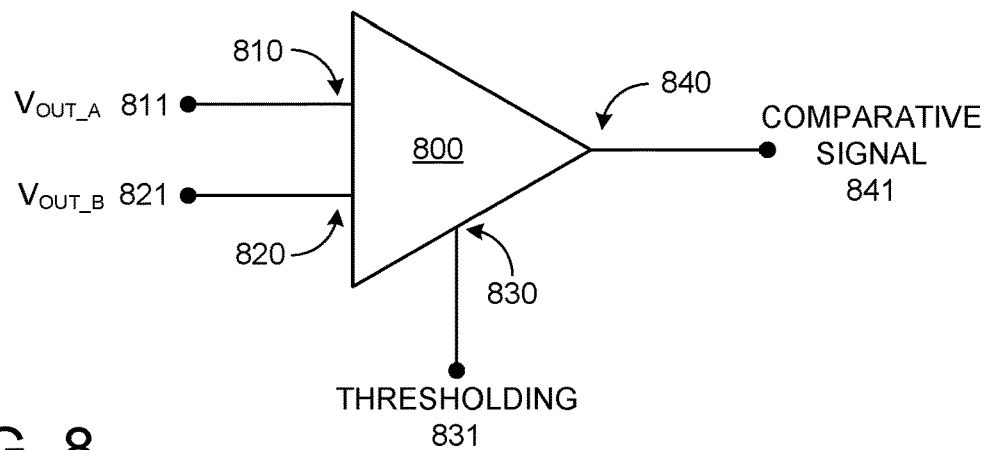
FIG. 8 schematically shows an example comparator circuit.

FIG. 8 shows one example comparator circuit 800 for determining whether a first and second signal differ by a threshold, Comparator circuit includes a first input 810, configured to receive a signal based on the readout of the first collection terminal ($V_{OUT\_A}$ 811), and a second input 820, configured to receive a signal based on the readout of the second collection terminal ($V_{OUT\_B}$ 821). A third input, 830, is configured to receive a thresholding signal 831, such as a hysteresis signal, Comparator circuit 800 further includes an output 840, configured to output a comparative signal 841 based on the result of the thresholding comparison.

As signal level increases, noise increases proportionate to the square root of the signal. As such, the thresholding signal may be set based on the square root of the signal. For example, the thresholding signal may be set to be based on $Sqrt(V_{OUT\_A}+V_{OUT\_B})+C$, where C is a constant. This allows the threshold to be modulated by the hysteresis, based on the signal values 811 and 821, without leaving the analog domain, and without measuring these signals at the ADC.

Figure 9:
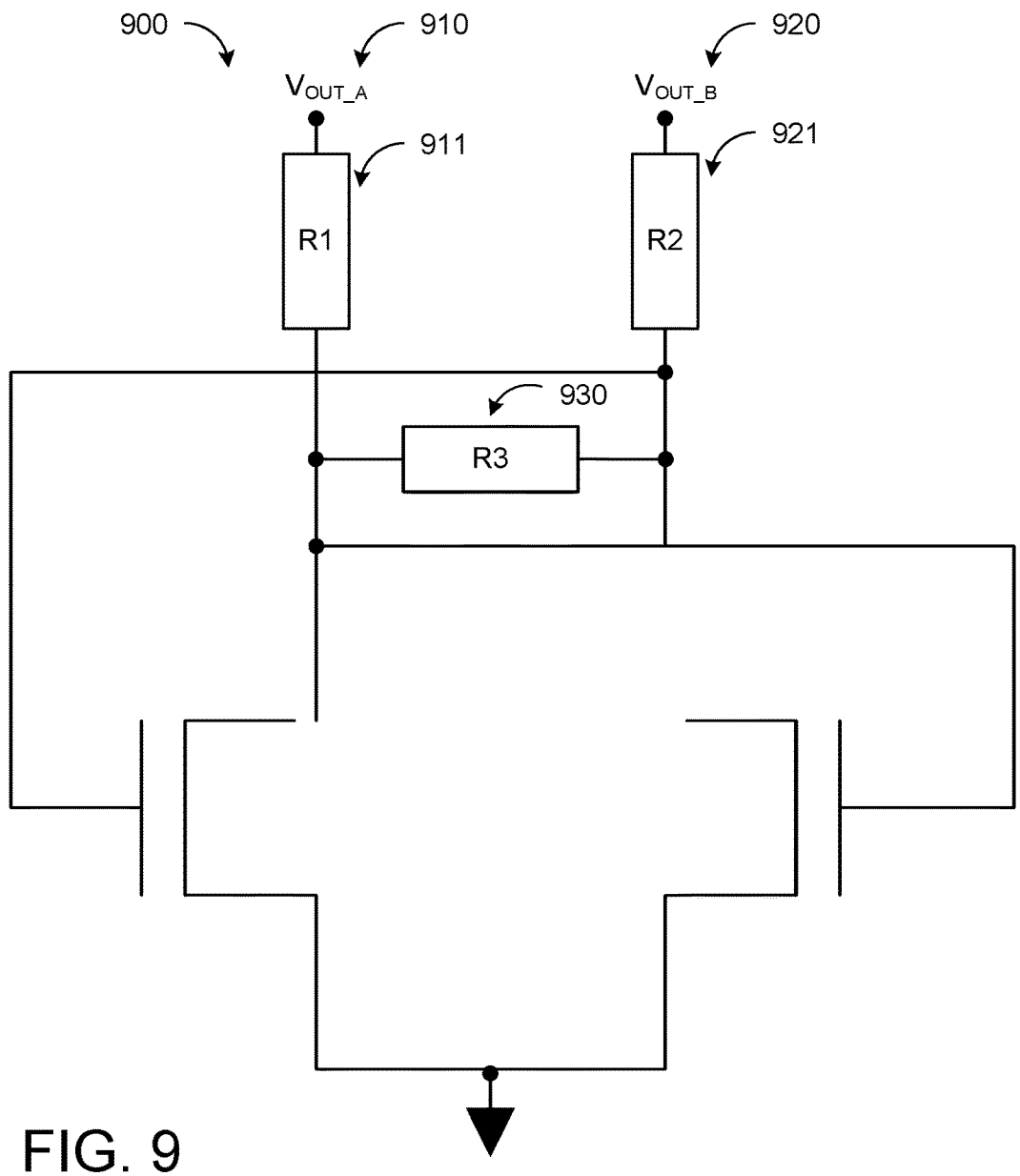
FIG. 9 schematically shows an example differential circuit.

As long as the threshold T is sufficiently above the level of noise N, a threshold circuit that approximates the noise N of signal S may be used to set the threshold T FIG. 9 schematically depicts an example differential circuit 900 that may be used as a comparator circuit whose threshold varies based on signal levels, Differential circuit 900 may be configured to simultaneously detect changes in signal and apply a signal differential to an automatically determined threshold, Differential circuit 900 includes first input 910, configured to apply a signal based on the readout of the first collection terminal ($V_{OUT\_A}$) across a first resistor 911 (R1), and a second input 920, configured to apply a signal based on the readout of the second collection terminal ($V_{OUT\_B}$) across a second resistor 921 (R2).

If there is a suitably large change $V_{OUT\_A}-V_{OUT\_B}$, a relatively larger voltage appears across a third resistor 930 (R3). Otherwise, the voltage across R3 is relatively smaller. Differential circuit 900 may thus be used to generate threshold changes as a function of common mode value in a fashion that approximates $Sqrt(change\ V_{OUT\_A}-V_{OUT\_B})+C$. The transistor drive may increase with increasing voltage, thus overpowering third resistor 930 more rapidly when the common mode is high (e.g., low signal). The output across third resistor 930 may then be sent to another comparator configured with a fixed threshold to determine whether a sufficient signal change has occurred.

Although differential circuit 900 has a large positive gain, in some examples, some amount of signal digitization and/or processing to remove signal polarity may be applied. Such a circuit may be cascaded with a non-tunable version of comparator 800 in some examples.

Returning to FIG. 5, If the first amount of charge is within a threshold of the second amount of charge, the first differential pixel may be maintained in the first, lower power mode. If the readout signals have a signal-to-noise ratio that is below a threshold, the first differential pixel may be operated in a higher power mode for a duration. For example, active illumination may be activated for a region of pixels in the sensor array that includes the first differential pixel, in order to obtain higher signal data.

If it is determined that there is a threshold change in charge accumulated between the first and second collection terminals, the first differential pixel is then operated in a second, higher power mode. In some examples, the second, higher power mode may include increased switching frequency between collection terminals, some degree of digital processing and/or ADC activation, activation of active illumination via a steerable illumination source, and/or entering ToF mode.

In some examples, the second, higher power mode is not a ToF mode. Rather, the second, higher power mode may be used to collect a higher degree of information than what is available via the first, lower power mode. As an example, the second, higher power mode may be a photo mode, wherein the illumination source is not activated, and the toggling between first and second collection terminals is increased above the first, lower power mode, but not to the MHz level associated with ToF imaging. The image data may be shunted to the ADC for evaluation. Photo information gathered at this second, higher power mode may then be used to determine whether the differential pixel and/or the entire pixel array should advance to an additional, higher power mode such as ToF.

As an example, a change in charge may be detected in two or more pixels within a region of the pixel array. The region of pixels may be shifted to the second, higher power mode whereat a picture of that region is taken and evaluated against a set of criteria. The set of criteria may include parameters indicating whether the picture is indicative of significant brightness change in the region, and or whether the picture is indicative of ongoing brightness changes in the region. If the picture fails to meet the set of criteria, the region of pixels may be returned to the first, lower power mode. If the set of criteria is met, the region of pixels may be advanced to a third power mode, higher than the second power mode, such as ToF imaging. In this way, the power mode may be increased incrementally, yet quickly, based on signal data. The camera may then respond to actual changes in the scene, while noise and fluctuations are scrutinized without entering a full-power ToF mode.

Figure 10A:
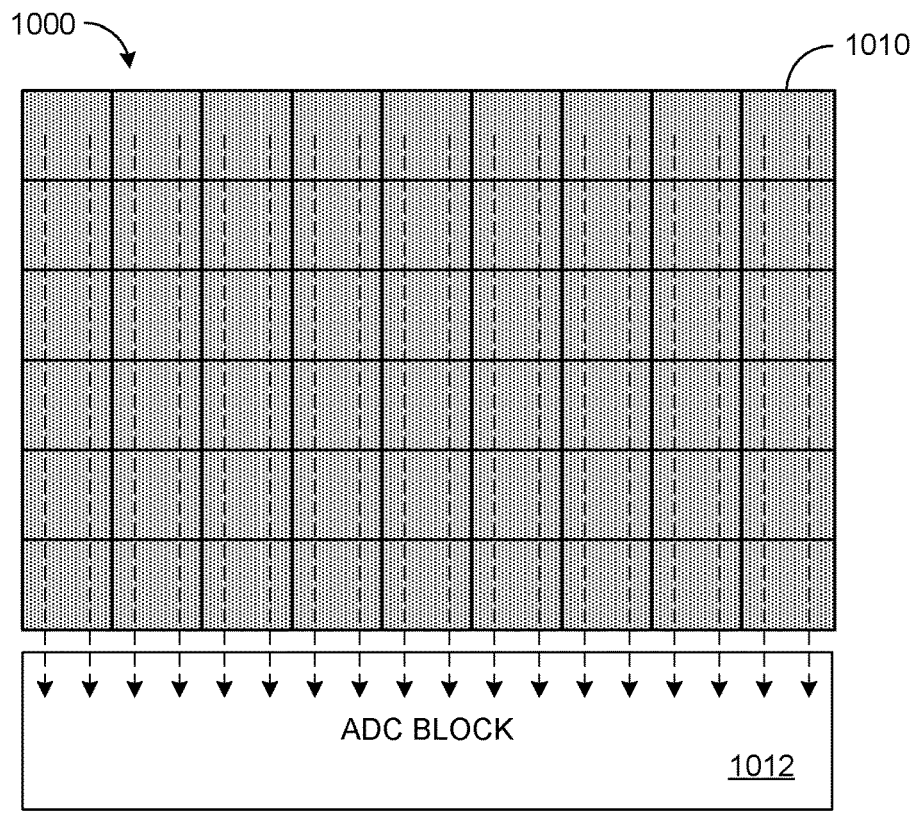
FIG. 10A schematically shows a pixel array operating at full resolution.
Figure 10B:
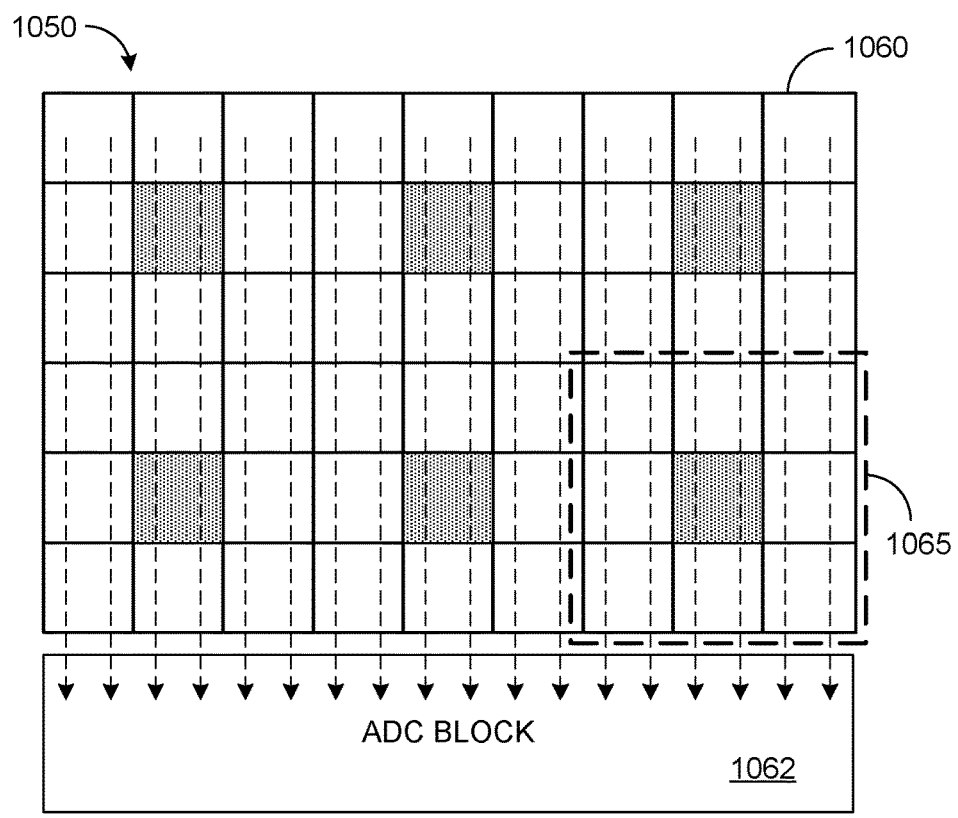
FIG. 10B schematically shows a decimated pixel array.

Additional power savings may be realized in lower power modes by selectively deactivating or combining pixels. FIG. 10A schematically shows a pixel array 1000 operating at full resolution. Pixel array 1000 includes region 1010, depicted as a 9×6 block of 54 pixels, coupled to ADC block 1012. In this example, each of the 54 pixels within region 1010 are activated. FIG. 10B schematically shows a decimated (e.g., subsampled) pixel array 1050. Pixel array 1050 includes region 1060, depicted as a 9×6 block of 54 pixels, coupled to ADC block 1062. In this example, region 1060 is divided into 9-pixel clusters, such as cluster 1065. In this example, one of the 9 pixels within cluster 1065 is activated, and thus 6 of the 54 pixels within region 1060 are activated (e.g., decimated by a factor of ⅑). Based on signals generated by the activated pixels within the pixel array, the inactivated pixels may become activated, increasing the resolution of the array as a first stage of a progressive wake process. Such a process may be applied within a region of a pixel array, rather than to individual pixels or to the entire array. This may reduce potentially unnecessary pixel activation and progression through higher power modes. In particular, the imaging device may include a steerable illumination source configured to individually actively illuminate different illumination zones of a plurality of illumination zones in a scene viewed by the sensor array. The steerable illumination source may only actively illuminate certain illumination zones corresponding with pixel array regions that indicate changes in brightness. Other pixel array regions may be maintained in a passive detection mode.

Figure 11:
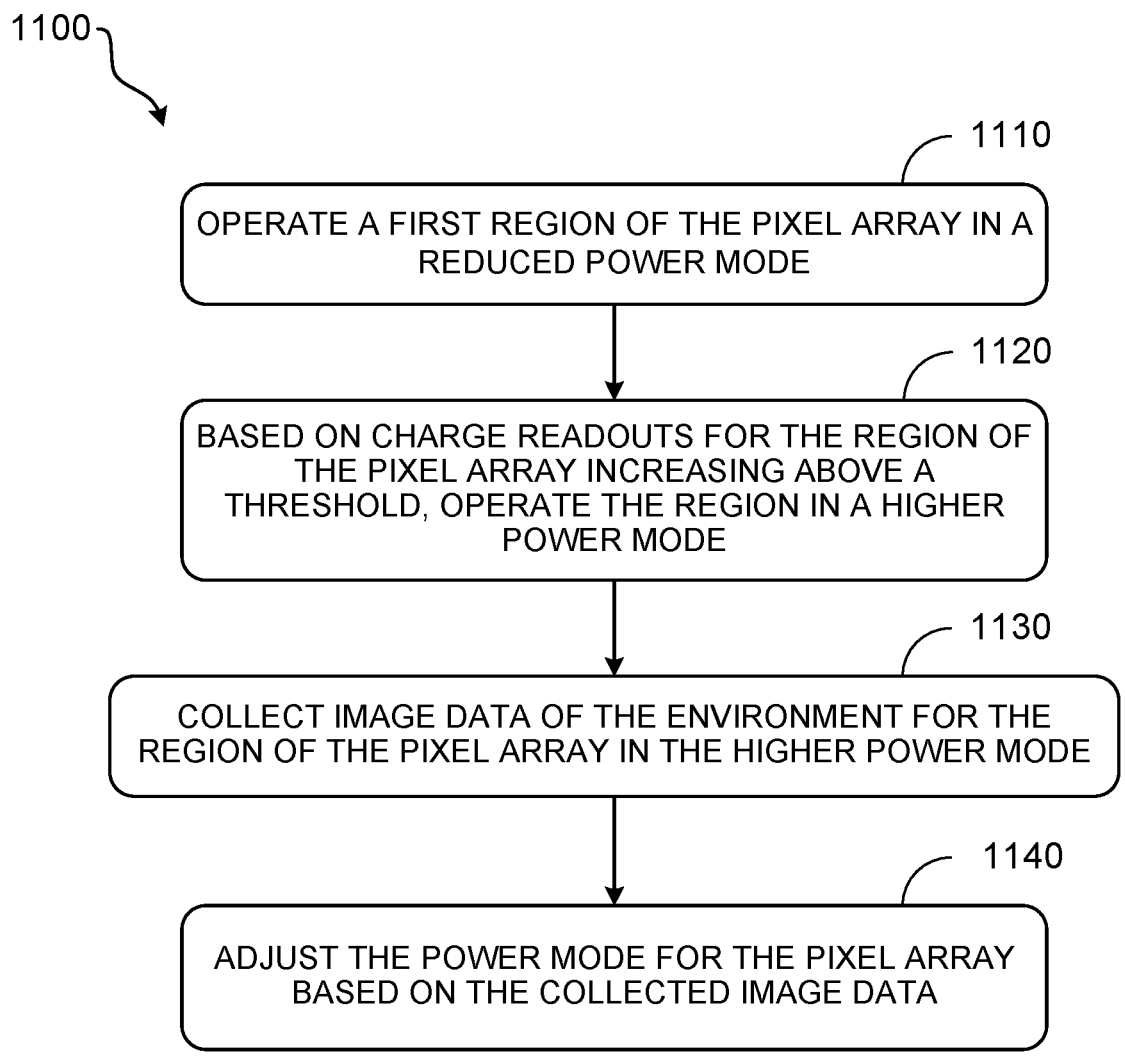
FIG. 11 shows a flow diagram depicting an example method for operating a pixel array including regions of differential time-of-flight pixels.

FIG. 11 depicts an example method 1100 for operating a pixel array including a plurality of regions of differential time-of-flight pixels. As one non-limiting example, the pixel array may be divided into 16 regions, but more or fewer regions may be used. In some examples, each of the plurality of regions may be equal in size and number of pixels included therein, while in other examples the regions may be incongruent, overlapping, or otherwise configured.

At 1110, method 1100 includes operating a first region of the pixel array in a reduced power mode. For example, the first region may include one more active pixels, each active pixel configured to operate in a first, lower power mode, such as the lower power mode described with regard to FIGS. 5 and 6 where the pixels are operated in a passive, low frequency mode. In some examples, operating in a reduced power mode includes subsampling the region, as described with regard to FIG. 10B. The first region may thus be considered decimated, with one or more inactive pixels. Two or more pixels may be grouped into a cluster, and one or more pixels read out to represent the cluster.

In some examples, operating in reduced power mode includes binning the outputs of two or more pixels together. Each pixel may be operated in the described low frequency, lower power mode, but the output signals for two or more pixels may be combined together for analysis. As an example, many pixel arrays include amplifiers that are configured to accept voltages from multiple (e.g., 4) pixels and perform resistive binning. Voltages from multiple first collection terminals may be combined at a common node via a first resistor, and voltages from multiple second collection terminals may be combined via a second resistor. The combined voltages may then be compared, for example as described with regards to FIGS. 7-9. By reading out multiple pixels at the same time, the power cost of reading out a single pixel is maintained.

At 1120, method 1100 includes, based on charge readouts for the first region of the pixel array increasing above a threshold, operating the first region of the pixel array in a higher power mode. Thresholding for each pixel or cluster of pixels may be performed as described with regard to FIGS. 8 and 9. In some examples, two or more pixels or clusters of pixels within a region may display threshold changes prior to the first region of the pixel array being operated in a higher power mode. As described with regard to FIG. 5, the higher power mode maybe a camera mode, ToF mode, or other higher power mode.

In some examples, the higher power mode may include activating all the pixels within the region individually, but operating the pixels in the first, lower power mode. For example, a decimated region, such as region 1060 shown in FIG. 10B may be converted into a fully activated region, such as region 1010 shown in FIG. 10A. However, each pixel may then be operated in a low frequency, passive imaging mode. In some examples, the entire pixel array may be operated at the higher power mode based on the charge readouts for the first region of the pixel array increasing above a threshold. For example, breaching of a first threshold may indicate to operate the region in a higher power mode, while breaching of a second, higher threshold may indicate to operate the entire array in a higher power mode, even if each other region of the pixel array does not demonstrate comparable levels of activity.

At 1130, method 1100 includes collecting image data of the environment for the region of the pixel array in the higher power mode. As described with regard to FIG. 5, collecting image data may include acquiring a passive camera image of the environment using the region of the pixel array. In some examples, collecting image data of the environment may include selectively illuminating an illumination zone of the environment in view of the array region. As such, the collected image data for the region may be 2D or 3D image data.

At 1140, method 1100 includes adjusting the power mode for the pixel array based on the collected image data. For example, if the image data indicates that the detected change in brightness is noise, transient, or otherwise not indicative of more power intensive imaging, at least the first region of the pixel array may be returned to a reduced power and/or low resolution mode. If the image data indicates that the detected change in brightness for at least the first region, the steerable illumination source may be activated for at least the first region. Active imaging data may then be collected of actively illuminated illumination zones in view of the pixels of the first region. In some examples, the steerable illumination source may progress to sequentially illuminate one or more illumination zones as other regions of the pixel array are operated in a higher power mode.

Detectable step function changes in brightness may occur within a frame (intra-frame) or between frames (inter-frame). Both intra-frame and inter-frame changes should be detected by the system in order for the methodology described herein to provide an effective detection scheme. However, it may be more challenging to detect brightness changes that occur during readout compared to during integration.

Figure 12:
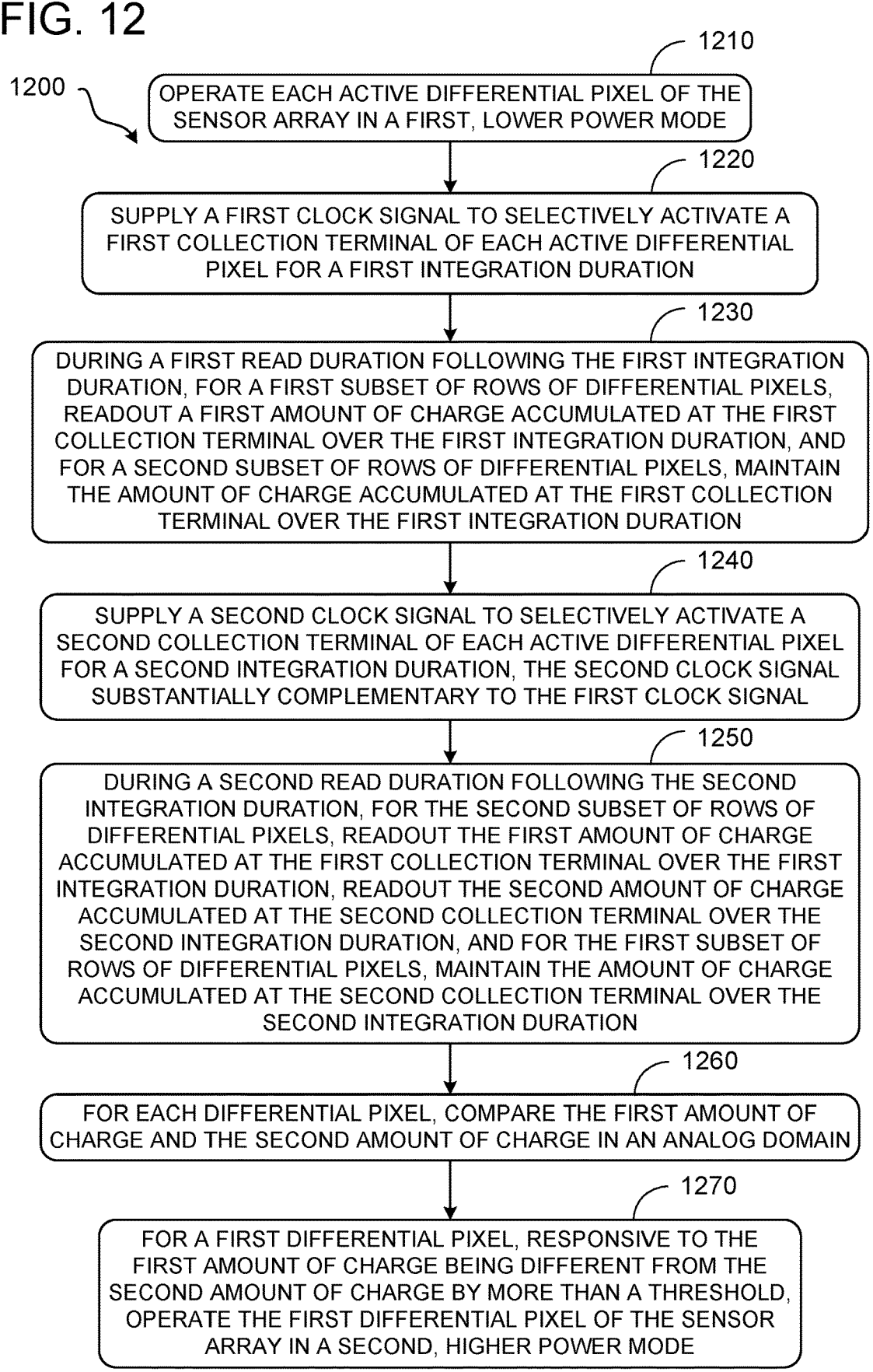
FIG. 12 shows a flow diagram depicting an example method for detecting step changes in brightness at a differential pixel.
Figure 13:
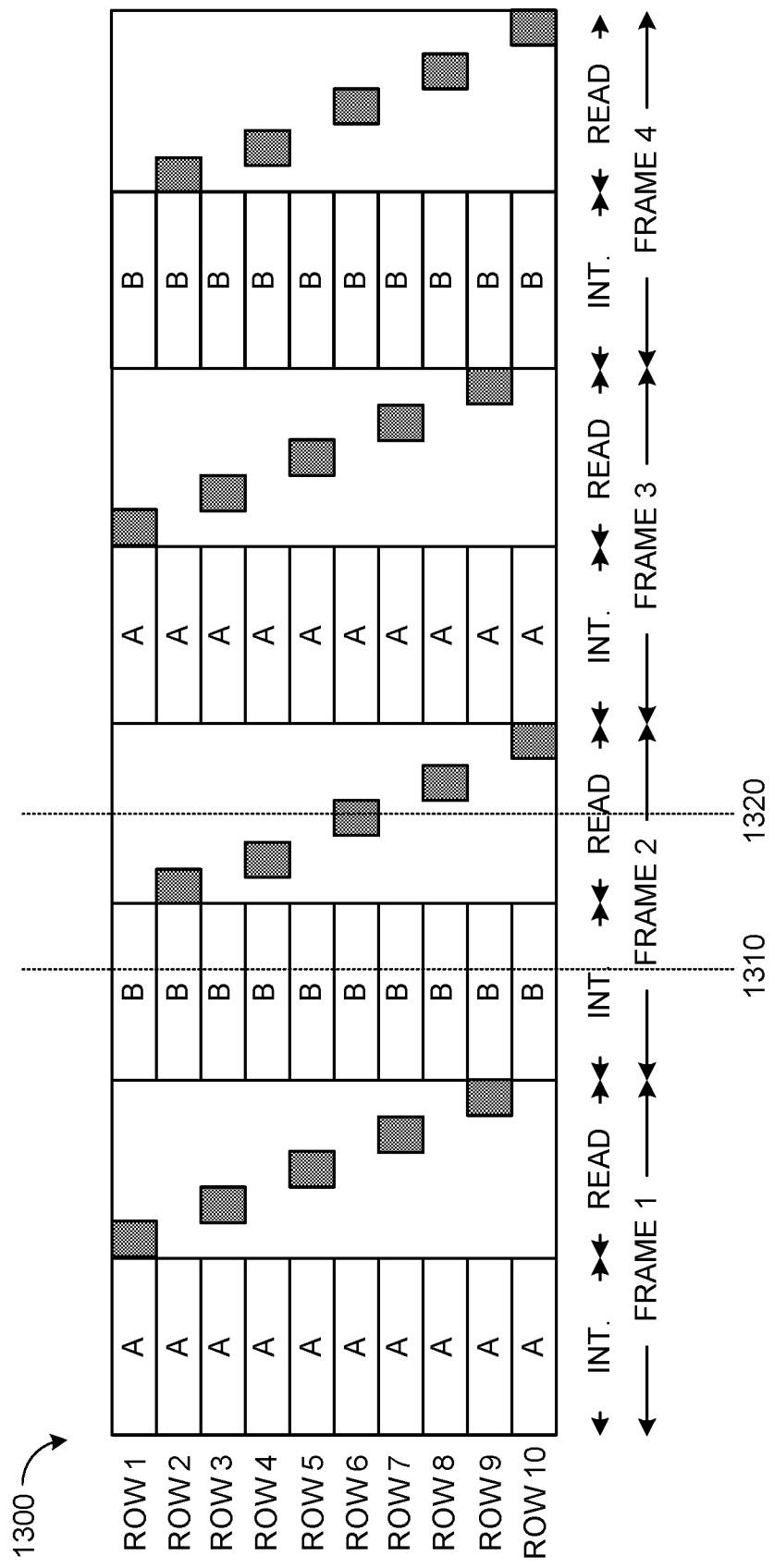
FIG. 13 shows an example timing diagram for operating a pixel array using the method of FIG. 12.

FIG. 12 shows an example method 1200 for detecting step changes in brightness, for example, during a low frequency, lower power mode as described herein. At 1210, method 1200 includes operating each active differential pixel of a sensor array in a first, lower power mode. At 1220, method 1200 includes supplying a first clock signal to selectively activate a first collection terminal of each active differential pixel for a first integration duration. These operations may be performed as described herein and with regard to FIG. 5 in some examples. For example, FIG. 13 shows an example timing plot 1300, displaying operations for 10 rows of differential pixels, though the pixel array may have more or fewer rows of pixels. The first clock signal may activate the "A" or first collection terminal for each differential pixel. In timing plot 1300, the first clock signal selectively activates the A terminal during the integration period of frames 1 and 3.

Returning to FIG. 12, at 1230, method 1200 includes, during a first read duration following the first integration duration, for a first subset of rows of differential pixels, reading out a first amount of charge accumulated at the first collection terminal over the first integration duration, and for a second subset of rows of differential pixels, maintain the amount of charge accumulated at the first collection terminal over the first integration duration. For example, timing plot 1300 shows odd rows (e.g., 1, 3, 5, 7, and 9) being read out during the read duration portions of frames 1 and 3. Even rows (e.g, 2, 4, 6, 8, and 10) are not read out during this read duration. The even rows thus maintain their charge as the array progresses into frame 2.

Returning to FIG. 12, at 1240, method 1200 includes supplying a second clock signal to selectively activate a second collection terminal of each active differential pixel for a second integration duration, the second clock signal substantially complementary to the first clock signal. For example, as shown in timing plot 1300, the second clock signal may activate the "B" or second collection terminal or each differential during the integration period of frames 2 and 4.

Returning to FIG. 12 at 1250, method 1200 includes, during a second read duration following the second integration duration, for the second subset of rows of differential pixels, reading out the first amount of charge accumulated at the first collection terminal over the first integration duration, reading out a second amount of charge accumulated at the second collection terminal over the second integration duration, and, for the first subset of rows of differential pixels, maintaining the amount of charge accumulated at the second collection terminal over the second integration duration. For example, timing plot 1300 shows even rows (e.g., 2, 4, 6, 8, and 10) being read out during the read duration portions of frames 2 and 4. Odd rows (e.g., 1, 3, 5, 7, and 9) are not read out during this read duration. The odd rows thus maintain their charge as the array progresses into frame 3.

Returning to FIG. 12, at 1260, method 1200 includes, for each differential pixel, comparing the first amount of charge and the second amount of charge in an analog domain, for example, as described with regard to FIGS. 8 and 9. If a step change occurs during the integration duration (as shown at 1310), this will be detected by even rows at the subsequent read period. For example, for row 2, integration at terminal A during frame 1 is held until readout during frame 2. During integration for terminal B during frame 2, the step change will cause the readout at terminal B to be higher than that for terminal A when they are readout simultaneously during readout of frame 2. If the step change occurs during the readout duration (as shown at 1320), odd rows will demonstrate a higher readout from terminal A than for terminal B when these rows are read out during frame 3. Scene objects that generate this brightness change are assumed to be large enough to span at least one odd and one even row.

Returning to FIG. 12, method 1200 includes, at 1270, for a first differential pixel, responsive to the first amount of charge being different from the second amount of charge by more than a threshold, operating the first differential pixel of the sensor array in a second, higher power mode.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
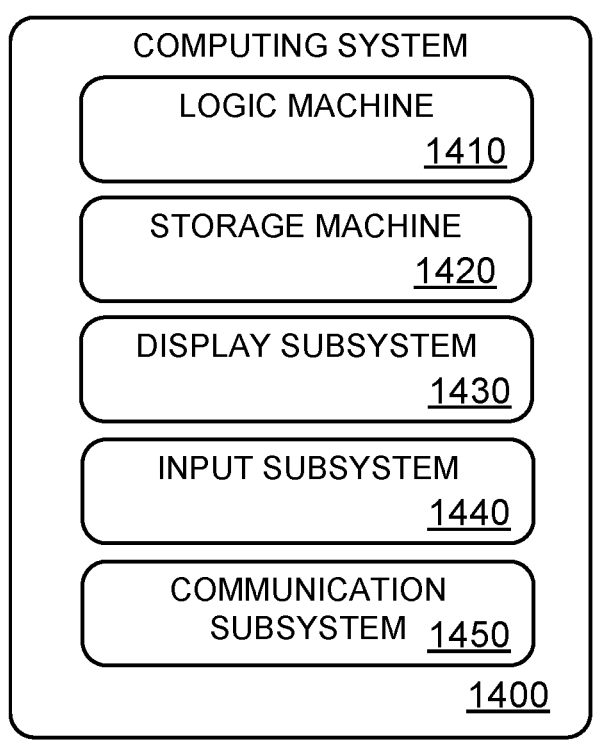
FIG. 14 schematically shows an example computing system.

FIG. 14 schematically shows a non-limiting embodiment of a computing system 1400 that can enact one or more of the methods and processes described above. Computing system 1400 is shown in simplified form. Computing system 1400 may take the form of one or more personal computers, server computers, tablet computers, home-entertainment computers, network computing devices, gaming devices, mobile computing devices, mobile communication devices (e.g., smart phone), and/or other computing devices.

Computing system 1400 includes a logic machine 1410 and a storage machine 1420. Computing system 1400 may optionally include a display subsystem 1430, input subsystem 1440, communication subsystem 1450, and/or other components not shown in FIG. 14.

Logic machine 1410 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1420 includes one or more physical devices configured to hold instructions executable by the logic machine to implement the methods and processes described herein. When such methods and processes are implemented, the state of storage machine 1420 may be transformed—e.g., to hold different data.

Storage machine 1420 may include removable and/or built-in devices. Storage machine 1420 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1420 may include volatile, nonvolatile, dynamic, static, read/write, read-only, random-access, sequential-access, location-addressable, file-addressable, and/or content-addressable devices.

It will be appreciated that storage machine 1420 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1410 and storage machine 1420 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1430 may be used to present a visual representation of data held by storage machine 1420. This visual representation may take the form of a graphical user interface (GUI). As the herein described methods and processes change the data held by the storage machine, and thus transform the state of the storage machine, the state of display subsystem 1430 may likewise be transformed to visually represent changes in the underlying data. Display subsystem 1430 may include one or more display devices utilizing virtually any type of technology. Such display devices may be combined with logic machine 1410 and/or storage machine 1420 in a shared enclosure, or such display devices may be peripheral display devices.

When included, input subsystem 1440 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1450 may be configured to communicatively couple computing system 1450 with one or more other computing devices. Communication subsystem 1450 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1400 to send and/or receive messages to and/or from other devices via a network such as the Internet.

In one example, an imaging system comprises a sensor array including a plurality of differential pixels; and a controller configured to: operate a first differential pixel of the sensor array in a first, lower power mode; supply a first clock signal to selectively activate a first collection terminal of the first differential pixel for a first duration; supply a second clock signal to selectively activate a second collection terminal of the first differential pixel for a second duration; readout a first amount of charge accumulated at the first collection terminal over the first duration; readout a second amount of charge accumulated at the second collection terminal over the second duration; compare the first amount of charge and the second amount of charge in an analog domain; and responsive to the first amount of charge being different from the second amount of charge by more than a threshold, operate the first differential pixel of the sensor array in a second, higher power mode. In such an example, or any other example, the threshold is additionally or alternatively based on the first amount of charge and the second amount of charge. In any of the preceding examples, or any other example, the first, lower power mode additionally or alternatively includes low frequency switching between activation of the first and second collection terminals. In any of the preceding examples, or any other example, the second, higher power mode additionally or alternatively includes time of flight imaging. In any of the preceding examples, or any other example, the second, higher power mode additionally or alternatively includes a passive camera mode including analog-to-digital conversion of image data collected at the pixel. In any of the preceding examples, or any other example, the controller is additionally or alternatively further configured to: evaluate digital image data collected during the passive camera mode against a set of criteria; and based on the digital image data meeting the set of criteria, operate the first differential pixel of the sensor array in a third power mode, higher than the second, higher power mode. In any of the preceding examples, or any other example, the controller is additionally or alternatively further configured to: based on the digital image data failing to meet the set of criteria, return the first differential pixel to the first, lower power mode. In any of the preceding examples, or any other example, the controller is additionally or alternatively configured to operate two or more differential pixels in the second, higher power mode based on the first amount of charge being different from the second amount of charge by more than the threshold. In any of the preceding examples, or any other example, the sensor array is additionally or alternatively divided into a plurality of regions of differential pixels, wherein the first differential pixel is additionally or alternatively located in a first region of differential pixels, and wherein the controller is additionally or alternatively configured to operate each pixel in the first region of differential pixels in the second, higher power mode based on the first amount of charge being different from the second amount of charge by more than the threshold.

In another example, a method for operating a sensor array including a plurality of differential pixels comprises operating a first differential pixel of the sensor array in a first, lower power mode; supplying a first clock signal to selectively activate a first collection terminal of the first differential pixel for a first duration; supplying a second clock signal to selectively activate a second collection terminal of the first differential pixel for a second duration; reading out a first amount of charge accumulated at the first collection terminal over the first duration; reading out a second amount of charge accumulated at the second collection terminal over the second duration; comparing the first amount of charge and the second amount of charge in an analog domain; and responsive to the first amount of charge being different from the second amount of charge by more than a threshold, operating the first differential pixel of the sensor array in a second, higher power mode. In such an example, or any other example, the threshold is additionally or alternatively based on the first amount of charge and the second amount of charge. In any of the preceding examples, or any other example, the first, lower power mode additionally or alternatively includes low frequency switching between activation of the first and second collection terminals. In any of the preceding examples, or any other example, the second, higher power mode additionally or alternatively includes time of flight imaging. In any of the preceding examples, or any other example, the second, higher power mode additionally or alternatively includes a passive camera mode including analog-to-digital conversion of image data collected at the pixel. In any of the preceding examples, or any other example, the method additionally or alternatively comprises evaluating digital image data collected during the passive camera mode against a set of criteria; and based on the digital image data meeting the set of criteria, operating the first differential pixel of the sensor array in a third power mode, higher than the second, higher power mode. In any of the preceding examples, or any other example, the method additionally or alternatively comprises, based on the digital image data failing to meet the set of criteria, returning the first differential pixel to the first, lower power mode. In any of the preceding examples, or any other example, the method additionally or alternatively comprises operating two or more differential pixels in the second, higher power mode based on the first amount of charge being different from the second amount of charge by more than the threshold. In any of the preceding examples, or any other example, the sensor array is additionally or alternatively divided into a plurality of regions of differential pixels, wherein the first differential pixel is additionally or alternatively located in a first region of differential pixels, and wherein the method additionally or alternatively comprises operating each pixel in the first region of differential pixels in the second, higher power mode based on the first amount of charge being different from the second amount of charge by more than the threshold.

In yet another example, an imaging system comprises a sensor array including a plurality of rows of differential pixels; and a controller configured to: operate each active differential pixel of the sensor array in a first, lower power mode; supply a first clock signal to selectively activate a first collection terminal of each active differential pixel for a first integration duration; during a first read duration following the first integration duration, for a first subset of rows of differential pixels, readout a first amount of charge accumulated at the first collection terminal over the first integration duration, and for a second subset of rows of differential pixels, maintain the amount of charge accumulated at the first collection terminal over the first integration duration; supply a second clock signal to selectively activate a second collection terminal of each active differential pixel for a second integration duration, the second clock signal substantially complementary to the first clock signal; during a second read duration following the second integration duration, for the second subset of rows of differential pixels, readout the first amount of charge accumulated at the first collection terminal over the first integration duration, readout a second amount of charge accumulated at the second collection terminal over the second integration duration, and for the first subset of rows of differential pixels, maintain the amount of charge accumulated at the second collection terminal over the second integration duration; for each differential pixel, compare the first amount of charge and the second amount of charge in an analog domain; and for a first differential pixel, responsive to the first amount of charge being different from the second amount of charge by more than a threshold, operate the first differential pixel of the sensor array in a second, higher power mode. In such an example, or any other example, two or more differential pixels of the sensor array are additionally or alternatively operated in the second, higher power mode responsive to the first amount of charge being different from the second amount of charge by more than the threshold.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An imaging system, comprising:
    a sensor array including a plurality of differential pixels; and
    a controller configured to:
        operate a first differential pixel of the sensor array in a first, lower power mode;
        supply a first clock signal to selectively activate a first collection terminal of the first differential pixel for a first duration;
        supply a second clock signal to selectively activate a second collection terminal of the first differential pixel for a second duration;
        readout a first amount of charge accumulated at the first collection terminal over the first duration;
        readout a second amount of charge accumulated at the second collection terminal over the second duration;
        compare the first amount of charge and the second amount of charge in an analog domain; and
        responsive to the first amount of charge being different from the second amount of charge by more than a threshold, operate the first differential pixel of the sensor array in a second, higher power mode,
        wherein the threshold is based on the first amount of charge and the second amount of charge.

2. The imaging system of claim 1, wherein the first, lower power mode includes low frequency switching between activation of the first and second collection terminals.

3. The imaging system of claim 1, wherein the second, higher power mode includes time of flight imaging.

4. The imaging system of claim 1, wherein the second, higher power mode includes a passive camera mode including analog-to-digital conversion of image data collected at the pixel.

5. The imaging system of claim 4, wherein the controller is further configured to:
evaluate digital image data collected during the passive camera mode against a set of criteria; and
based on the digital image data meeting the set of criteria, operate the first differential pixel of the sensor array in a third power mode, higher than the second, higher power mode.

6. The imaging system of claim 5, wherein the controller is further configured to:
based on the digital image data failing to meet the set of criteria, return the first differential pixel to the first, lower power mode.

7. The imaging system of claim 1, wherein the controller is configured to operate two or more differential pixels in the second, higher power mode based on the first amount of charge being different from the second amount of charge by more than the threshold.

8. The imaging system of claim 7, wherein the sensor array is divided into a plurality of regions of differential pixels, wherein the first differential pixel is located in a first region of differential pixels, and wherein the controller is configured to operate each pixel in the first region of differential pixels in the second, higher power mode based on the first amount of charge being different from the second amount of charge by more than the threshold.

9. A method for operating a sensor array including a plurality of differential pixels, the method comprising:
operating a first differential pixel of the sensor array in a first, lower power mode;
supplying a first clock signal to selectively activate a first collection terminal of the first differential pixel for a first duration;
supplying a second clock signal to selectively activate a second collection terminal of the first differential pixel for a second duration;
reading out a first amount of charge accumulated at the first collection terminal over the first duration;
reading out a second amount of charge accumulated at the second collection terminal over the second duration;
comparing the first amount of charge and the second amount of charge in an analog domain; and
responsive to the first amount of charge being different from the second amount of charge by more than a threshold, operating the first differential pixel of the sensor array in a second, higher power mode,
wherein the threshold is based on the first amount of char e and the second amount of charge.

10. The method of claim 9, wherein the first, lower power mode includes low frequency switching between activation of the first and second collection terminals.

11. The method of claim 9, wherein the second, higher power mode includes time of flight imaging.

12. The method of claim 9, wherein the second, higher power mode includes a passive camera mode including analog-to-digital conversion of image data collected at the pixel.

13. The method of claim 12, further comprising:
evaluating digital image data collected during the passive camera mode against a set of criteria; and
based on the digital image data meeting the set of criteria, operating the first differential pixel of the sensor array in a third power mode, higher than the second, higher power mode.

14. The method of claim 13, further comprising:
based on the digital image data failing to meet the set of criteria, returning the first differential pixel to the first, lower power mode.

15. The method of claim 9, further comprising:
operating two or more differential pixels in the second, higher power mode based on the first amount of charge being different from the second amount of charge by more than the threshold.

16. The method of claim 15, wherein the sensor array is divided into a plurality of regions of differential pixels, wherein the first differential pixel is located in a first region of differential pixels, and wherein the method further comprises:
operating each pixel in the first region of differential pixels in the second, higher power mode based on the first amount of charge being different from the second amount of charge by more than the threshold.

17. An imaging system comprising:
a sensor array including a plurality of rows of differential pixels; and
a controller configured to:
operate each active differential pixel of the sensor array in a first, lower power mode;
supply a first clock signal to selectively activate a first collection terminal of each active differential pixel for a first integration duration;
during a first read duration following the first integration duration, for a first subset of rows of differential pixels, readout a first amount of charge accumulated at the first collection terminal over the first integration duration, and for a second subset of rows of differential pixels, maintain the amount of charge accumulated at the first collection terminal over the first integration duration;
supply a second clock signal to selectively activate a second collection terminal of each active differential pixel for a second integration duration, the second clock signal substantially complementary to the first clock signal;
during a second read duration following the second integration duration, for the second subset of rows of differential pixels, readout the first amount of charge accumulated at the first collection terminal over the first integration duration, readout a second amount of charge accumulated at the second collection terminal over the second integration duration, and for the first subset of rows of differential pixels, maintain the amount of charge accumulated at the second collection terminal over the second integration duration;
for each differential pixel, compare the first amount of charge and the second amount of charge in an analog domain; and
for a first differential pixel, responsive to the first amount of charge being different from the second amount of charge by more than a threshold, operate the first differential pixel of the sensor array in a second, higher power mode.

18. The imaging system of claim 17, wherein two or more differential pixels of the sensor array are operated in the second, higher power mode responsive to the first amount of charge being different from the second amount of charge by more than the threshold.

\* \* \* \* \*